US011698110B2

(12) United States Patent
Dutkiewicz et al.

(10) Patent No.: US 11,698,110 B2
(45) Date of Patent: Jul. 11, 2023

(54) DIRECT PINION MOUNT JOINT ASSEMBLY

(71) Applicant: DANA AUTOMOTIVE SYSTEMS GROUP, LLC, Maumee, OH (US)

(72) Inventors: Jeffrey A. Dutkiewicz, Maumee, OH (US); Ryan M. Hecklinger, Colorado Springs, CO (US); Seung Tark Oh, Maumee, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 253 days.

(21) Appl. No.: 16/954,315

(22) PCT Filed: Dec. 20, 2018

(86) PCT No.: PCT/US2018/066834
§ 371 (c)(1),
(2) Date: Jun. 16, 2020

(87) PCT Pub. No.: WO2019/135931
PCT Pub. Date: Jul. 11, 2019

(65) Prior Publication Data
US 2021/0140487 A1 May 13, 2021

Related U.S. Application Data

(60) Provisional application No. 62/612,921, filed on Jan. 2, 2018.

(51) Int. Cl.
*F16D 3/224* (2011.01)
*B25B 27/00* (2006.01)
(Continued)

(52) U.S. Cl.
CPC .......... *F16D 3/224* (2013.01); *B25B 27/0035* (2013.01); *B25B 27/026* (2013.01);
(Continued)

(58) Field of Classification Search
CPC ...... F16D 2001/103; F16D 1/116; F16D 3/06; F16D 3/18; F16D 2250/0084;
(Continued)

(56) References Cited

U.S. PATENT DOCUMENTS 6,293,873 B1   9/2001  Iwano
7,305,765 B2  12/2007  Mitsue
(Continued)

FOREIGN PATENT DOCUMENTS

EP         2806180       11/2014
WO      2015077679        5/2015

*Primary Examiner* — Richard M Lorence
(74) *Attorney, Agent, or Firm* — Marshall & Melhorn, LLC

(57) ABSTRACT

A joint assembly for use in a motor vehicle. The joint assembly includes a first joint member that is drivingly connected to a second joint member via one or more third joint members. At least a portion of the first joint member is drivingly connected to at least a portion of a first shaft and at least a portion of the second joint member is drivingly connected to at least a portion of a second shaft. One or more first joint member tool grooves circumferentially extends along the outer surface of the first joint member. The joint assembly further includes a nut that drivingly connects at least a portion of a third shaft to at least a portion of the second shaft. The nut includes one or more nut tool grooves circumferentially extending along the outer surface of the nut.

18 Claims, 12 Drawing Sheets

(51) Int. Cl.
  *B25B 27/02* (2006.01)
  *F16D 3/06* (2006.01)
  *F16D 1/116* (2006.01)
  *F16D 3/223* (2011.01)
  *F16D 1/10* (2006.01)

(52) U.S. Cl.
  CPC ............... *F16D 1/116* (2013.01); *F16D 3/06* (2013.01); *F16D 3/223* (2013.01); *F16D 2001/103* (2013.01); *F16D 2003/22323* (2013.01); *F16D 2250/0084* (2013.01); *F16D 2300/08* (2013.01); *F16D 2300/12* (2013.01)

(58) Field of Classification Search
  CPC .. F16D 2300/08; F16D 2300/12; F16D 3/223; F16D 3/224; F16D 2003/22323; B25B 27/0035; B25B 27/026; Y10S 464/906
  See application file for complete search history.

(56) References Cited

U.S. PATENT DOCUMENTS

| | | | |
|---|---|---|---|
| 7,553,238 | B2 | 6/2009 | Wormsbaecher |
| 7,691,001 | B2 | 4/2010 | Lutz |
| 7,867,099 | B2 | 1/2011 | Szentmihalyi |
| 7,997,990 | B2 | 8/2011 | Hahn |
| 8,231,298 | B2 | 7/2012 | Szentmihalyi |
| 8,262,489 | B2 | 9/2012 | Valovick |
| 8,556,737 | B2 | 10/2013 | Yamauchi |
| 8,864,591 | B2 | 10/2014 | Sugiyama |
| 9,695,878 | B2 | 7/2017 | Nicholas |
| 2016/0017929 | A1* | 1/2016 | Sugiyama ............... F16D 1/116 464/142 |
| 2016/0290409 | A1* | 10/2016 | Metzger .................. F16D 1/116 |

* cited by examiner

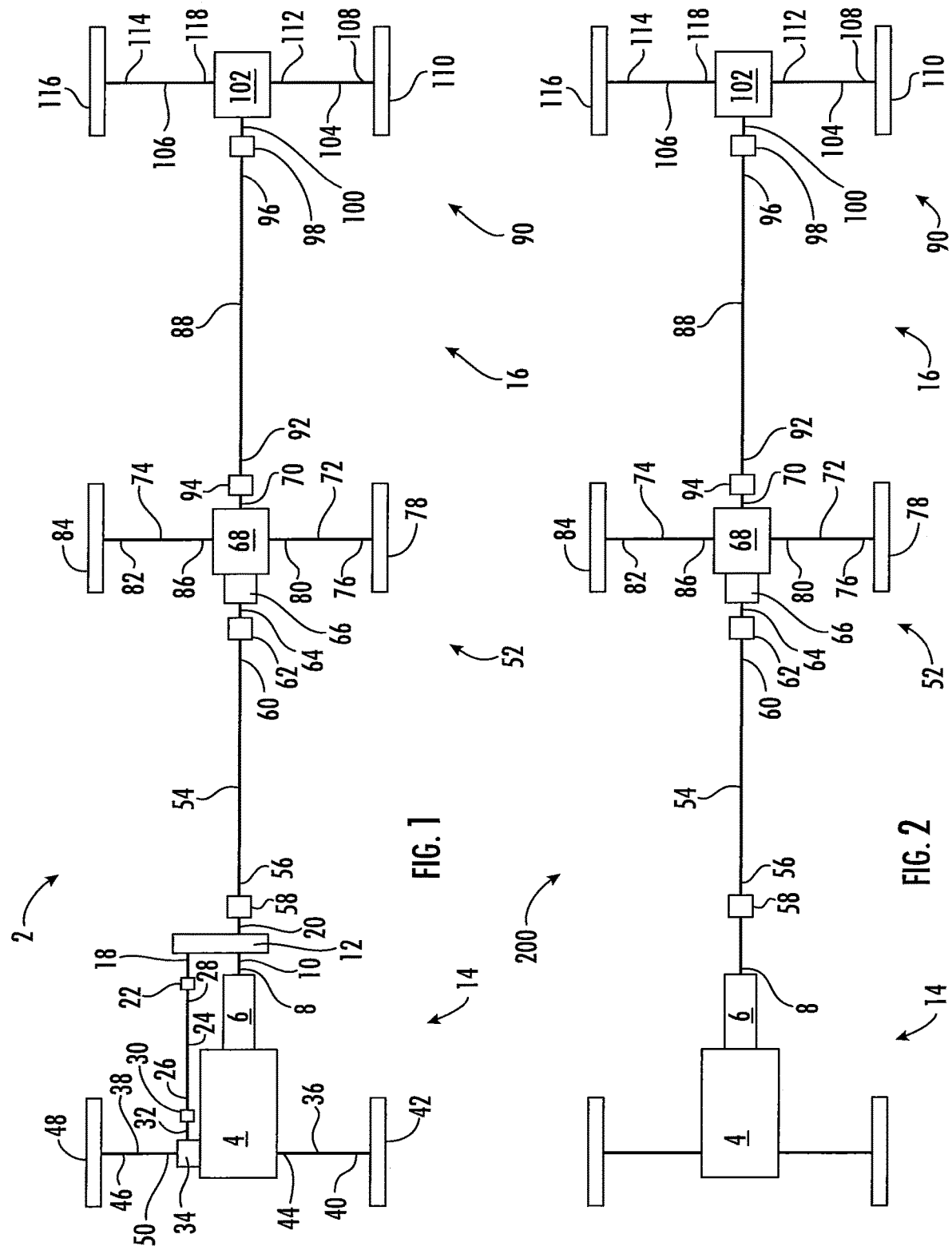

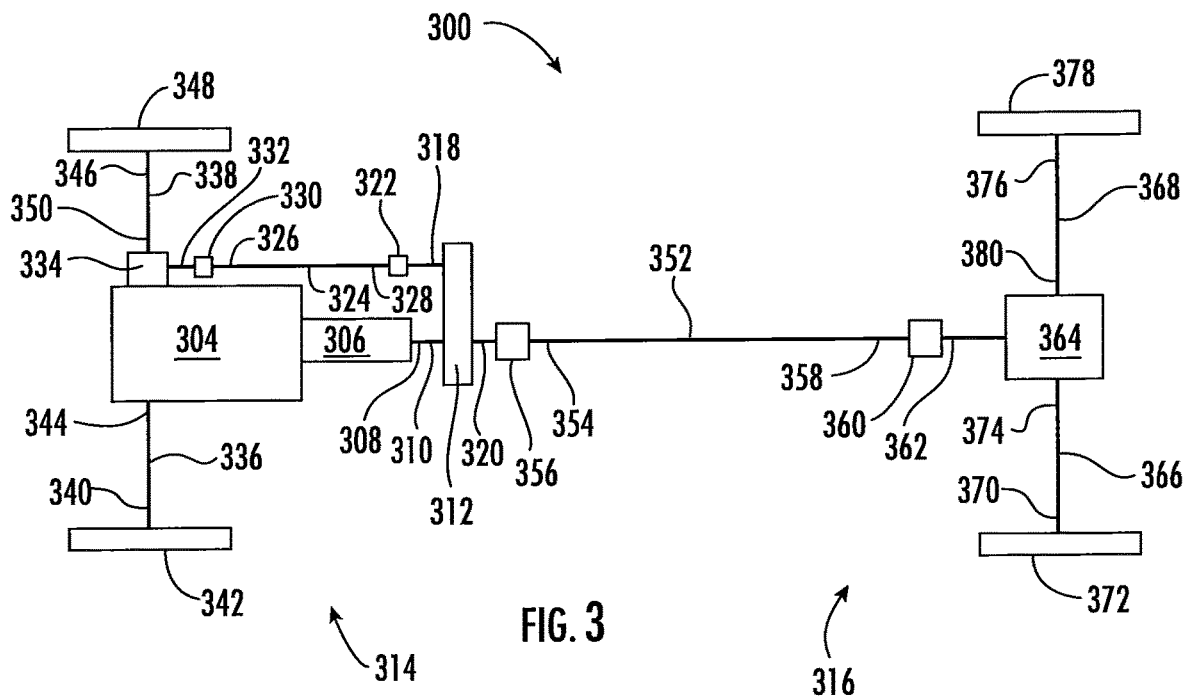

DETAIL A

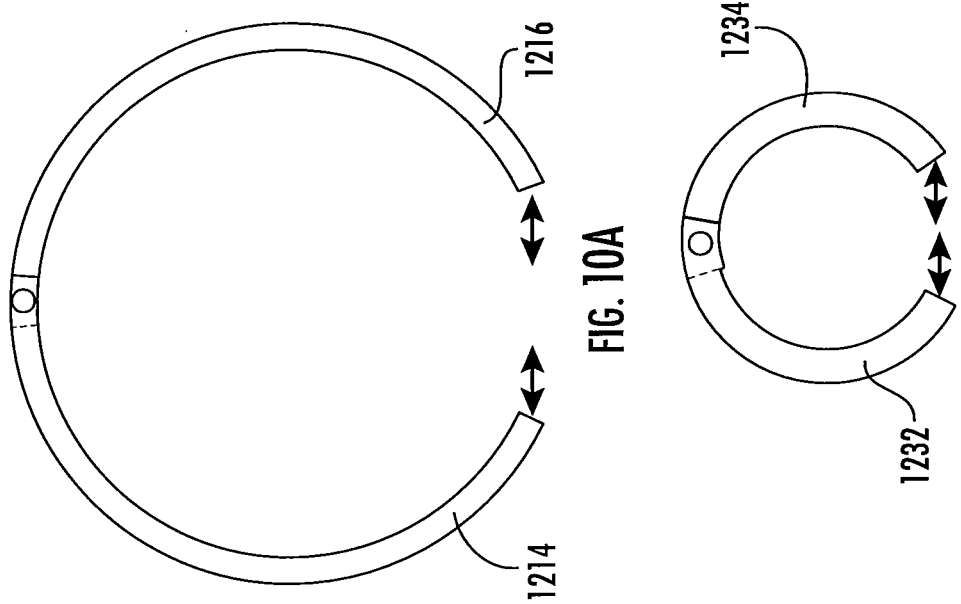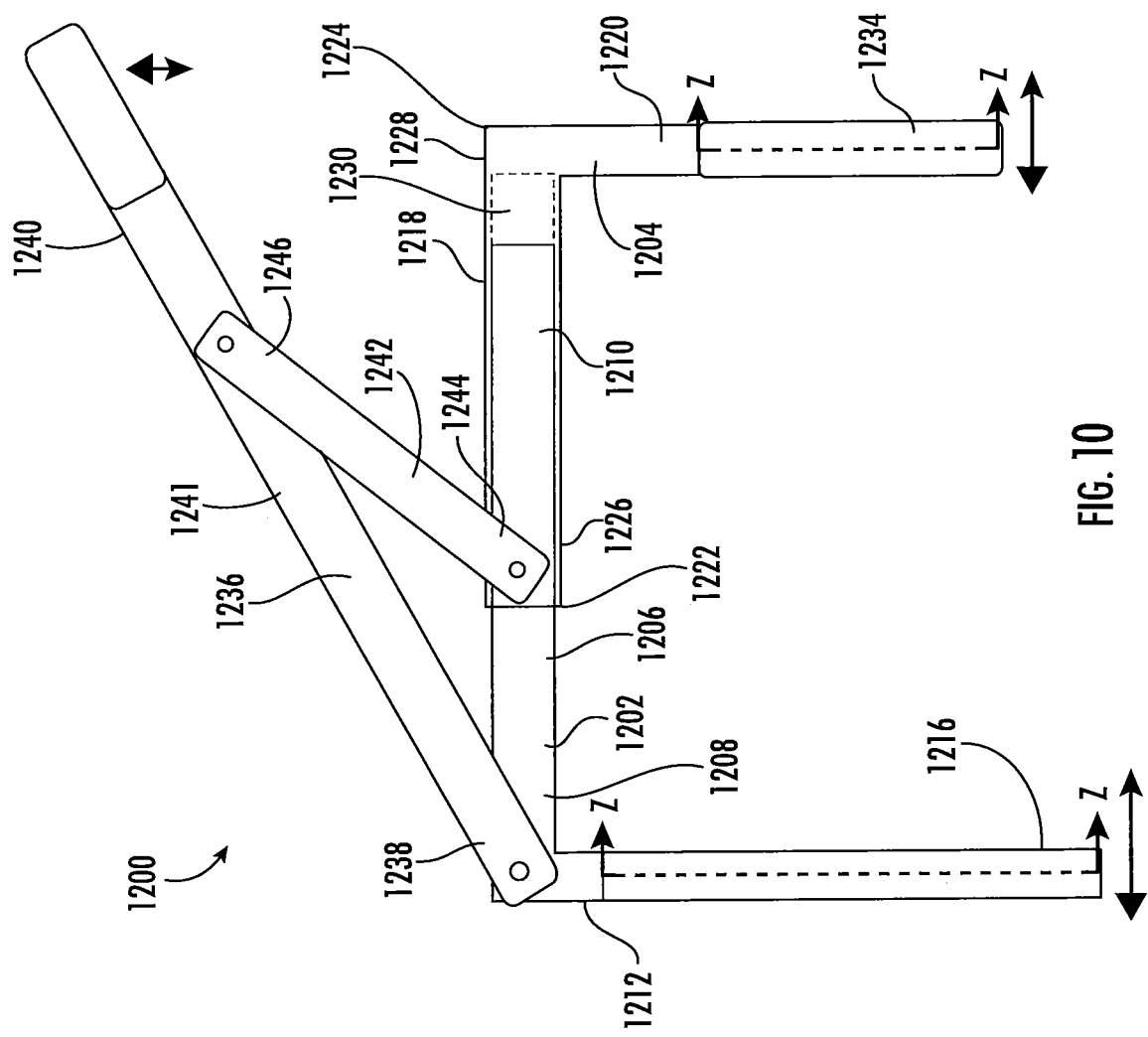

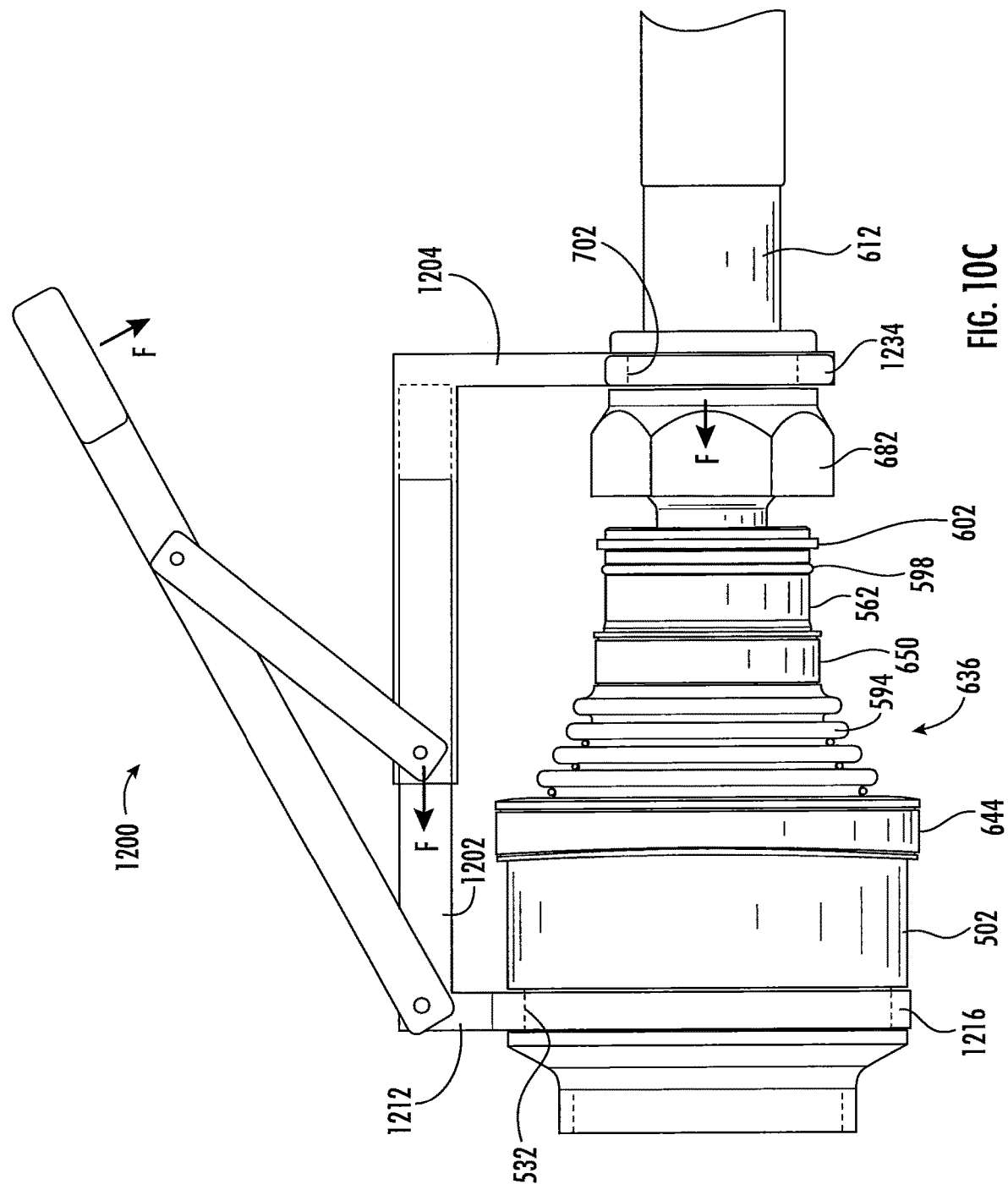

DIRECT PINION MOUNT JOINT ASSEMBLY

CROSS-REFERENCE TO RELATED APPLICATIONS

The present application claims the benefit to U.S. Provisional Patent Application No. 62/612,921 filed on Jan. 2, 2018, which is incorporated herein by reference in its entirety.

FIELD OF THE DISCLOSURE

The present disclosure relates to a direct pinion mount joint assembly for use in a motor vehicle.

BACKGROUND OF THE DISCLOSURE

Constant velocity joint assemblies allow for the translation of rotational energy from one shaft having a variable angle, to be transferred through a vehicle drive-train at a constant rotational speed without an appreciable increase in either friction or play. Conventional constant velocity joint assemblies require additional complex assembly processes. Typically, these additional processes needed to assemble a conventional constant velocity joint assembly require the use of complex, specialized and costly equipment that takes up space and requires additional man power on the assembly line. This increases the overall time and costs associated with the assembly of the constant velocity joint assembly. It would therefore be advantageous to develop a joint assembly that has increased transmission efficiency, is more cost efficient and is easy to assemble.

SUMMARY OF THE DISCLOSURE

A joint assembly for use in a motor vehicle. The joint assembly includes a first joint member that is drivingly connected to a second joint member via one or more third joint members. At least a portion of the first joint member is drivingly connected to at least a portion of a first shaft and at least a portion of the second joint member is drivingly connected to at least a portion of a second shaft. A first joint member tool groove circumferentially extends along at least a portion of the outer surface of the first joint member. The joint assembly further includes a nut that drivingly connects at least a portion of a third shaft to at least a portion of the second shaft. The nut includes a nut tool groove circumferentially extending along at least a portion of the outer surface of the nut.

According to the previous aspect of the disclosure, the joint assembly may be a constant velocity joint assembly, a CV joint assembly, a homokinetic joint assembly or a direct pinion mount constant velocity joint assembly.

According to any one of the previous aspects of the disclosure, the third shaft is may be a pinion gear shaft.

According to any one of the previous aspects of the disclosure, the joint assembly may further include a flexible boot assembly with a flexible boot having a first end portion, a second end portion and an intermediate portion interposed between the first and second end portions. At least a portion of the first end portion of the flexible boot may be connected to at least a portion of the first joint member and at least a portion of the second end portion of the flexible may be connected to at least a portion of the second shaft.

According to any one of the previous aspects of the disclosure, the intermediate portion of the flexible boot may include one or more convolutions defined by one or more peaks and one or more valleys.

According to any one of the previous claims, the flexible boot assembly may further include one or more third retaining members. At least a portion of the one or more third retaining members may be disposed within one or more of the one or more valleys of the one or more convolutions in the intermediate portion of the flexible boot.

According to any one of the previous aspects of the disclosure, the flexible boot assembly may further include an adapter having a first side, a second side, a radially outboard end portion and a radially inboard end portion. A first joint member mating portion may circumferentially extend outward from at least a portion of the first side of the adapter. The first joint member mating portion may be complementary to and meshingly engaged with at least a portion of an adapter receiving groove circumferentially extending inward from at least a portion of the second end of the first joint member.

According to any one of the previous aspects of the disclosure, the adapter may further include an increased diameter portion. At least a portion of the increased diameter portion of the adapter may be received and/or retained within at least a portion of a recess circumferentially extending along at least a portion of an inner surface of the first end portion of the flexible boot.

According to any one of the previous aspects of the disclosure, the nut may include a nut retaining member groove that circumferentially extends along at least a portion of the first inner surface of the nut. The nut retaining member groove may be complementary to a second retaining member groove circumferentially extending along at least a portion of an outer surface of the second shaft. At least a portion of a second retaining member may be received and/or retained within at least a portion of the nut retaining member groove in the nut and the second retaining member groove in the second shaft.

According to any one of the previous aspects of the disclosure, the nut may further include a plurality of nut threads that circumferentially extends along at least a portion of the second inner surface of the nut. The plurality of nut threads may be complementary to and meshingly engaged with at least a portion of a plurality of plurality of third shaft threads circumferentially extending along at least a portion of an outer surface of the third shaft.

According to any one of the previous aspects of the disclosure, the third shaft may further include a nut stopper portion that circumferentially extends along at least a portion of an outer surface of the third shaft. The nut stopper portion may be disposed adjacent to an end of the plurality of third shaft threads on the outer surface of the third shaft opposite the second shaft. The nut stopper portion may provide a positive stop for the nut thereby preventing the nut from turning off or unscrewing when the joint assembly is in operation.

According to any one of the previous aspects of the disclosure, the third shaft may further include a nut stopper portion that circumferentially extends along at least a portion of an outer surface of the third shaft. The nut stopper portion may be disposed adjacent to an end of the plurality of third shaft threads on the outer surface of the third shaft opposite the second shaft. The outer surface of the nut stopper portion may have a radius R2 from a centerline of the joint assembly that increases from a first end portion to a second end portion of the nut stopper portion. A reduced diameter portion may circumferentially extend from at least a portion of the second inner surface of the nut and an innermost surface of the reduced diameter portion of may have a radius R3 from the centerline of the joint assembly the increases from a first end portion to a second end portion of the reduced diameter portion. The nut stopper portion of the third shaft and the reduced diameter portion of the nut may provide an interference fit between the nut and the third shaft providing a positive stop for the nut thereby preventing the nut from turning off or unscrewing when the joint assembly is in operation.

According to any one of the previous aspects of the disclosure, the radius R3 of the reduced diameter portion on the nut may be substantially equal to or less than the radius R2 of the nut stopper portion on the third shaft.

According to any one of the previous aspects of the disclosure, one or more axially extending portions may extend outward from at least a portion of the second end of the nut. At least a portion of the one or more axially extending portions may be plastically deformed inward into one or more staking grooves extending along at least a portion of the outer surface of the third shaft. The one or more axially extending portions may be used in order to prevent the nut from turning off or unscrewing when the joint assembly is in operation.

According to any one of the previous aspects of the disclosure, the nut may include one or more cut-back portions that circumferentially extend inward from at least a portion of the second end of the nut. The one or more cut-back portions may be disposed proximate to an end of the one or more axially extending portions of the nut. The one or more cut-back portions may be used in order to aid in plastically deforming the one or more axially extending portions into the one or more staking grooves in the third shaft.

According to any one of the previous aspects of the disclosure, the third shaft may further include a third shaft retaining member groove that circumferentially extends along at least a portion of the outer surface of the third shaft. The third shaft retaining member groove may be disposed adjacent to an end of the third shaft threads on the third shaft opposite the second shaft. A second nut retaining member groove may circumferentially extend along at least a portion of the second inner surface of the nut. At least a portion of a fourth retaining member may be received and/or retained within at least a portion of the third shaft retaining member groove in the third shaft and the second nut retaining member groove in the nut.

According to any one of the previous aspects of the disclosure, the nut may further include one or more set-screw apertures that extend from an innermost surface of the one or more nut tool grooves in the nut to the second inner surface of the nut. At least a portion of one or more set-screws may be received and/or retained within at least a portion of the one or more set-screw apertures in the nut. The one or more set-screws may be used in order to prevent the nut from turning off or unscrewing when the joint assembly is in operation.

According to any one of the previous aspects of the disclosure, the joint assembly may further include a second nut having a first end, a second end, a first end portion, a second end portion, an inner surface and an outer surface. A plurality of second nut threads may circumferentially extend along at least a portion of the inner of the second nut. The plurality of second nut threads may be complementary to and meshingly engaged with a second plurality of nut threads circumferentially extending along at least a portion of an outer surface of the third shaft. At least a portion of a fourth sealing member may be interposed between and sealingly engaged with at least a portion of the outer surface of the second nut and an inner surface of a housing.

According to any one of the previous aspects of the disclosure, the joint assembly may further include a slinger that is connected to at least a portion of the outer surface of the second nut and is disposed outboard from at least a portion of the housing.

According to any one of the previous aspects of the disclosure, the second nut may have an increased diameter portion that extends outward from at least a portion of the outer surface of the second nut. The increased diameter portion may be used in order to prevent an amount of dirt and/or debris from coming into direct contact with the slinger.

According to any one of the previous aspects of the disclosure, the second nut may further include one or more axially extending portions that extend outward from at least a portion of the first end of the second nut. At least a portion of the one or more axially extending portions of the second nut may be plastically deformed inward into one or more staking grooves extending along at least a portion of the outer surface of the third shaft. The one or more axially extending portions may be used in order to prevent the second nut from turning off or unscrewing when the joint assembly is in operation.

According to any one of the previous aspects of the disclosure, the second nut may further include one or more cut-back portions that circumferentially extend inward from at least a portion of the first end of the second nut. The one or more cut-back portions may be disposed proximate to an end of the one or more axially extending portions of the second nut and the one or more cut-back portions may be used in order to aid in plastically deforming the one or more axially extending portions into the one or more staking grooves in the third shaft.

According to any one of the previous aspects of the disclosure, the joint assembly may further include a tool having a first gripping arm, a second gripping arm, a third gripping arm and/or a fourth gripping arm. At least a portion of the first gripping arm and/or the second gripping arm may be selectively engagable with at least a portion of the first joint member tool groove in the first joint member. Additionally, at least a portion of the third gripping arm and/or the fourth gripping arm may be selectively engagable with the nut tool groove in the nut. The tool may be used in order to apply an amount of force onto the first joint member and the nut in order to drive the nut and the third shaft toward and/or away from the second shaft to selectively connect and/or disconnect the nut to and/or from the second shaft.

According to any one of the previous aspects of the disclosure, the tool may include a first body portion, a second body portion, a first arm and a second arm. At least a portion of the first gripping arm and/or the second gripping arm may be connected to at least a portion of the first body portion of the tool and at least a portion of the first body portion of the tool may be connected to at least a portion of the second body portion of the tool. Additionally, at least a portion of the third gripping arm and/or the fourth gripping arm may be connected to at least a portion of the second body portion of the tool and at least a portion of the first arm of the tool may be connected to at least a portion of the first body portion of the tool. Furthermore, at least a portion of the second arm may be connected to at least a portion of the first arm and the second body portion of the tool. By selectively moving the first arm of the tool, the first body portion may be translated axially relative to the second body portion of the tool, in order to selectively connect and/or disconnect the nut to and/or from the second shaft.

According to any one of the previous aspects of the disclosure, the tool may include a first body portion, a second body portion, a first arm and a second arm. At least a portion of the first gripping arm and/or the second gripping arm may be connected to at least a portion of the first body portion of the tool and at least a portion of the first body portion of the tool may be connected to at least a portion of the second body portion of the tool. Additionally, at least a portion of a shaft portion of an actuation device may be drivingly connected to at least a portion of the first body portion and/or the second body portion of the tool. By selectively moving the shaft portion of the actuation device of the tool, the first body portion may be translated axially relative to the second body portion of the tool, in order to selectively connect and/or disconnect the nut to and/or from the second shaft.

According to any one of the previous aspects of the disclosure, the actuation device may a pneumatic actuation device or a hydraulic actuation device.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 1 is a schematic top-plan view of a vehicle having one or more joint assemblies according to an embodiment of the disclosure;

FIG. 2 is a schematic top-plan view of another vehicle having one or more joint assemblies according to an embodiment of the disclosure;

FIG. 3 is a schematic top-plan view of yet another vehicle having one or more joint assemblies according to an embodiment of the disclosure;

FIG. 4 is a schematic top-plan view of still yet another vehicle having one or more joint assemblies according to an embodiment of the disclosure;

FIG. 10 is a schematic side-view of a tool according to an embodiment of the disclosure;

FIG. 10A is a schematic front-view of a portion of the tool according to the embodiment of the disclosure illustrated in FIG. 10;

FIG. 10B is a schematic front-view of a portion of the tool according to the embodiment of the disclosure illustrated in FIG. 10;

FIG. 10C is a schematic side-view of a portion of the joint assembly illustrated in FIGS. 5-9 and the tool illustrated in FIGS. 10-10B of the disclosure.

DETAILED DESCRIPTION OF THE DISCLOSURE

Figure 5:
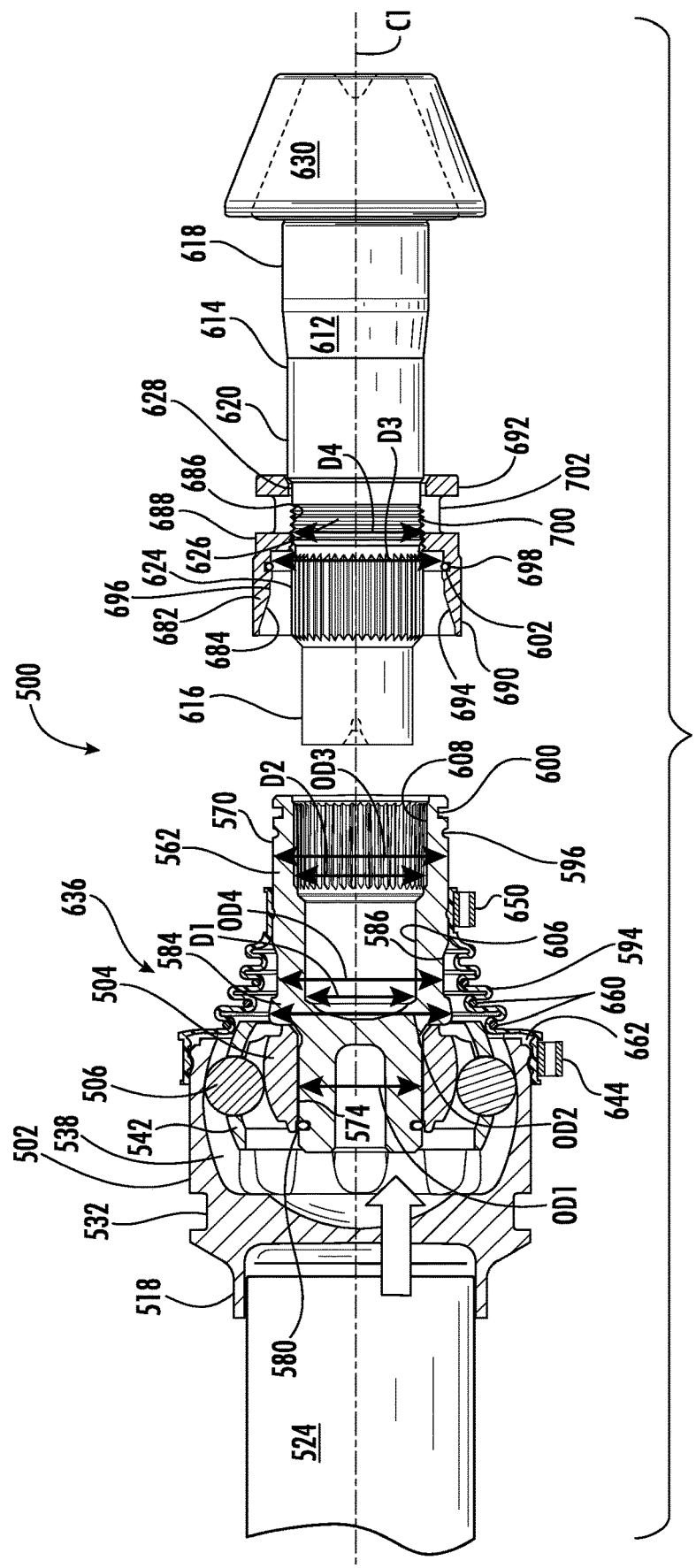
FIG. 5 is a partial cut-away schematic side-view of a joint assembly according to an embodiment of the disclosure.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Additionally, it is within the scope of this disclosure, and as a non-limiting example, that the joint assembly disclosed herein may be used in automotive, off-road vehicle, all-terrain vehicle, construction, structural, marine, aerospace, locomotive, military, machinery, robotic and/or consumer product applications. Additionally, as a non-limiting example, the joint assembly disclosed herein may also be used in passenger vehicle, electric vehicle, hybrid vehicle, commercial vehicle, autonomous vehicles, semi-autonomous vehicles and/or heavy vehicle applications.

FIG. 1 is a schematic top-plan view of a vehicle 2 having one or more joint assemblies according to an embodiment of the disclosure. As illustrated in FIG. 1 of the disclosure and as a non-limiting example, the vehicle 2 has an engine 4 which is drivingly connected to a transmission 6. As non-limiting example, the engine 4 of the vehicle 2 may be an internal combustion engine, an electric motor, a steam turbine and/or a gas turbine. A transmission output shaft 8 is then drivingly connected to an end of the transmission 6 opposite the engine 4. The transmission 6 is a power management system which provides controlled application of the rotational power generated by the engine 4 by means of a gear box.

Drivingly connected to an end of the transmission output shaft 8, opposite the transmission 6, is a transfer case input shaft 10. An end of the transfer case input shaft 10, opposite the transmission output shaft 8, is drivingly connected to at least a portion of a transfer case 12 of the vehicle 2. The transfer case 12 of the vehicle 2 allows for the selective transfer the rotational power from the transmission 6 to a front axle system 14 and a tandem axle system 16 of the vehicle 2 by utilizing a series of gears and drive shafts. As illustrated in FIG. 1 of the disclosure and as a non-limiting example, the transfer case 12 includes a first transfer case output shaft 18 and a second transfer case output shaft 20.

At least a portion of an end of the first transfer case output shaft 18, opposite the transfer case 12, is drivingly connected to at least a portion of an end of a first joint assembly 22. It is within the scope of this disclosure and as a non-limiting example that the first joint assembly 22 may be a universal coupling assembly, a U-joint assembly, a cardan joint assembly, a double cardan joint assembly, a Spicer joint assembly, a Hardy Spicer Joint assembly, a Hooke's joint assembly, a constant velocity joint assembly, a CV joint assembly or a homokinetic joint assembly.

Extending from the first transfer case output shaft 18 toward the front axle system 14 of the vehicle 2 is a first shaft 24 having a first end portion 26 and a second end portion 28. The first shaft 24 transmits the rotational power from the transfer case 12 to the front axle system 14 of the vehicle 2 thereby drivingly connecting the transfer case 12 to the front axle system 14. At least a portion of the second end portion 28 of the first shaft 24 is drivingly connected to an end of the first joint assembly 22 opposite the first transfer case output shaft 18 of the vehicle 2. It is within the scope of this disclosure and as a non-limiting example that the first shaft 24 may be a drive shaft, a propeller shaft, a Cardan shaft or a double Cardan shaft.

As illustrated in FIG. 1 of the disclosure and as a non-limiting example, at least a portion of a second end portion 26 of the first shaft is drivingly connected to an end of a second joint assembly 30. It is within the scope of this disclosure and as a non-limiting example that the second joint assembly 30 may be a universal coupling assembly, a U-joint assembly, a cardan joint assembly, a double cardan joint assembly, a Spicer joint assembly, a Hardy Spicer Joint assembly, a Hooke's joint assembly, a constant velocity joint assembly, a CV joint assembly or a homokinetic joint assembly.

Drivingly connected to an end of the second joint assembly 30, opposite the first shaft 24, is an end of a front axle system input shaft 32. The front axle system input shaft 32 drivingly connects the first shaft 24 to a front axle system differential assembly 34 of the front axle system 14 of the vehicle 2. As illustrated in FIG. 1 of the disclosure and as a non-limiting example, at least a portion of an end of the front axle system input shaft 32, opposite the first shaft 24, is drivingly connected to the front axle system differential assembly 34. It is within the scope of this disclosure and as a non-limiting example that the front axle system input shaft 32 may be front differential input shaft, a coupling shaft, stub shaft or a front differential pinion shaft. The front axle system differential assembly 34 is a set of gears that allows the outer drive wheel(s) of the vehicle 2 to rotate at a faster rate that the inner drive wheel(s). The rotational power is transmitted through the front axle system 14 as described in more detail below.

The front axle system 14 further includes a first front axle half shaft 36 and a second front axle half shaft 38. As illustrated in FIG. 1 of the disclosure and as a non-limiting example, the first front axle half shaft 36 extends substantially perpendicular to the front axle system input shaft 32 of the vehicle 2. At least a portion of a first end portion 40 of the first front axle half shaft 36 is drivingly connected to a first front axle wheel assembly 42 and at least a portion of a second end portion 44 of the first front axle half shaft 36 is drivingly connected to an end of the front axle system differential assembly 34. It is within the scope of this disclosure and as a non-limiting example that the second end portion 44 of the first front axle half shaft 36 may be drivingly connected to a front differential side gear, a separate stub shaft, a separate coupling shaft, a first front axle differential output shaft, a first front axle half shaft connect and disconnect assembly and/or a shaft that is formed as part of a front differential side gear.

Extending substantially perpendicular to the front axle system input shaft 32 is the second front axle half shaft 38 of the vehicle 2. At least a portion of a first end portion 46 of the second front axle half shaft 38 is drivingly connected to a second front axle wheel assembly 48 of the vehicle 2. As illustrated in FIG. 1 of the disclosure and as a non-limiting example, at least a portion of a second end portion 50 of the second front axle half shaft 38 is drivingly connected to an end of the front axle system differential assembly 34 opposite the first front axle half shaft 36. It is within the scope of this disclosure and as a non-limiting example that the second end portion 50 of the second front axle half shaft 38 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

An end of the second transfer case output shaft 20 is drivingly connected to an end of the transfer case 12 opposite the transfer case input shaft 10. Extending from the second transfer case output shaft 20 toward a forward tandem axle system 52 of the tandem axle system 16 of the vehicle 2 is a second shaft 54. It is within the scope of this disclosure and as a non-limiting example that the second shaft 54 of the vehicle 2 may be a drive shaft, a propeller shaft, a Cardan shaft or a double Cardan shaft.

As illustrated in FIG. 1 of the disclosure and as a non-limiting example, at least a portion of a first end portion 56 of the second shaft 54 is drivingly connected to an end of a third joint assembly 58. Drivingly connected to an end of the third joint assembly 58, opposite the second shaft 54, is an end of the second transfer case output shaft 20 opposite the transfer case 12. It is within the scope of this disclosure and as a non-limiting example that the third joint assembly 58 may be a universal coupling assembly, a U-joint assembly, a cardan joint assembly, a double cardan joint assembly, a Spicer joint assembly, a Hardy Spicer Joint assembly, a Hooke's joint assembly, a constant velocity joint assembly, a CV joint assembly or a homokinetic joint assembly.

At least a portion of a second end portion 60 of the second shaft 54 is a fourth joint assembly 62. It is within the scope of this disclosure and as a non-limiting example that the fourth joint assembly 62 of the vehicle 2 may be a may be a universal coupling assembly, a U-joint assembly, a cardan joint assembly, a double cardan joint assembly, a Spicer joint assembly, a Hardy Spicer Joint assembly, a Hooke's joint assembly, a constant velocity joint assembly, a CV joint assembly or a homokinetic joint assembly.

Drivingly connected to an end of the fourth joint assembly 62, opposite the second shaft 54, is a forward tandem axle system input shaft 64. As a non-limiting example, the forward tandem axle input shaft 64 may be a forward tandem axle differential input shaft, a coupling shaft, stub shaft, a forward tandem axle differential pinion shaft, an inter-axle differential input shaft or an inter-axle differential pinion shaft. Drivingly connected to an end of the forward tandem axle input shaft 64, opposite the second shaft 54, is an inter-axle differential assembly 66 of the forward tandem axle system 52 of the vehicle 2. The inter-axle differential assembly 66 is a device that divides the rotational power generated by the engine 4 between the axles in the vehicle 2. The rotational power is transmitted through the forward tandem axle system 52 as described in more detail below.

As illustrated in FIG. 1 of the disclosure and as a non-limiting example, the inter-axle differential assembly 66 of the vehicle 2 is drivingly connected to a forward tandem axle system differential assembly 68 and a forward tandem axle system output shaft 70. The forward tandem axle system differential assembly 68 is a set of gears that allows the outer drive wheel(s) of the vehicle 2 to rotate at a faster rate than the inner drive wheel(s).

The forward tandem axle system 52 of the vehicle 2 further includes a first forward tandem axle half shaft 72 and a second forward tandem axle half shaft 74. As illustrated in FIG. 1 of the disclosure and as a non-limiting example, the first forward tandem axle half shaft 72 extends substantially perpendicular to the forward tandem axle input shaft 64 of the vehicle 2. At least a portion of a first end portion 76 of the first forward tandem axle half shaft 72 is drivingly connected to a first forward tandem axle wheel assembly 78 and at least a portion of a second end portion 80 of the first forward tandem axle half shaft 72 is drivingly connected to an end of the forward tandem axle system differential assembly 68. It is within the scope of this disclosure and as a non-limiting example that the second end portion 80 of the first forward tandem axle half shaft 72 may be drivingly connected to a forward tandem axle differential side gear, a separate stub shaft, a separate coupling shaft, a first forward tandem axle differential output shaft, a first forward tandem axle half shaft connect and disconnect assembly and/or a shaft that is formed as part of a forward tandem axle differential side gear.

Extending substantially perpendicular to the forward tandem axle system input shaft 64 is the second front axle half shaft 74 of the vehicle 2. At least a portion of a first end portion 82 of the second front axle half shaft 74 is drivingly connected to a second forward tandem axle wheel assembly 84 of the vehicle 2. As illustrated in FIG. 1 of the disclosure and as a non-limiting example, at least a portion of a second end portion 86 of the second forward tandem axle half shaft 74 is drivingly connected to an end of the forward tandem axle differential assembly 8 opposite the first forward tandem axle half shaft 72. It is within the scope of this disclosure and as a non-limiting example that the second end portion 86 of the second forward tandem axle half shaft 74 may be drivingly connected to a forward tandem differential side gear, a separate stub shaft, a separate coupling shaft, a second forward tandem axle differential output shaft, a second forward tandem axle half shaft connect and disconnect assembly and/or a shaft that is formed as part of a forward tandem differential side gear.

Drivingly connected to an end of the forward tandem axle system output shaft 70, opposite the inter-axle differential assembly 66, is a third shaft 88. The third shaft 88 extends from the forward tandem axle system output shaft 70 toward a rear tandem axle system 90 of the vehicle 2. As a result, the third shaft 88 drivingly connects the inter-axle differential assembly 66 to the rear tandem axle system 90 of the vehicle 2. It is within the scope of this disclosure and as a non-limiting example that the third shaft 88 may be a drive shaft, a propeller shaft, a Cardan Shaft or a double Cardan shaft.

Drivingly connected to at least a portion of a first end portion 92 of the third shaft 88 is a fifth joint assembly 94. As illustrated in FIG. 1 of the disclosure and as a non-limiting example, at least a portion of an end of the forward tandem axle system output shaft 70, opposite the inter-axle differential 66, is drivingly connected to an end of the fifth joint assembly 94 opposite the third shaft 88. It is within the scope of this disclosure and as a non-limiting example that the fifth joint assembly 94 may be a may be a universal coupling assembly, a U-joint assembly, a cardan joint assembly, a double cardan joint assembly, a Spicer joint assembly, a Hardy Spicer Joint assembly, a Hooke's joint assembly, a constant velocity joint assembly, a CV joint assembly or a homokinetic joint assembly.

At least a portion of a second end portion 96 of the third shaft 88 is drivingly connected to an end of a sixth joint assembly 98 of the vehicle 2. It is within the scope of this disclosure and as a non-limiting example that the sixth joint assembly 98 of the vehicle 2 may be a may be a universal coupling assembly, a U-joint assembly, a cardan joint assembly, a double cardan joint assembly, a Spicer joint assembly, a Hardy Spicer Joint assembly, a Hooke's joint assembly, a constant velocity joint assembly, a CV joint assembly or a homokinetic joint assembly.

Drivingly connected to an end of the sixth joint assembly 98, opposite the third shaft 88, is a rear tandem axle system input shaft 100. The rear tandem axle system input shaft 100 extends from the third shaft 88 toward the rear tandem axle system 90 thereby drivingly connecting the inter-axle differential 66 to the rear tandem axle system 90 of the vehicle 2. It is within the scope of this disclosure and as a non-limiting example that the rear tandem axle system input shaft 100 may be a rear tandem axle differential input shaft, a coupling shaft, stub shaft or a rear tandem axle differential pinion shaft. Drivingly connected to an end of the rear tandem axle input shaft 100, opposite the third shaft 88, is a rear tandem axle system differential assembly 102 of the rear tandem axle system 90 of the vehicle 2. The rear tandem axle system differential assembly 102 is a set of gears that allows the outer drive wheel(s) of the vehicle 2 to rotate at a faster rate than the inner drive wheel(s). The rotational power is transmitted through the rear tandem axle system 90 as described in more detail below.

As illustrated in FIG. 1 of the disclosure and as a non-limiting example, the rear tandem axle system 90 further includes a first rear tandem axle half shaft 104 and a second rear tandem axle half shaft 106. The first rear tandem axle half shaft 104 extends substantially perpendicular to the rear tandem axle system input shaft 100 of the vehicle 2. At least a portion of a first end portion 108 of the first rear tandem axle half shaft 104 is drivingly connected to a first rear tandem axle wheel assembly 110 and at least a portion of a second end portion 112 of the first rear tandem axle half shaft 104 is drivingly connected to an end of the rear tandem axle system differential assembly 102. It is within the scope of this disclosure and as a non-limiting example that the second end portion 112 of the first rear tandem axle half shaft 104 is drivingly connected to a rear tandem axle differential side gear, a separate stub shaft, a separate coupling shaft, a first rear tandem axle differential output shaft, a first rear tandem axle half shaft connect and disconnect assembly and/or a shaft that is formed as part of a rear tandem axle differential side gear.

Extending substantially perpendicular to the rear tandem axle system input shaft 100 is the second rear tandem axle half shaft 106 of the vehicle 2. At least a portion of a first end portion 114 of the second rear tandem axle half shaft 106 is drivingly connected to a second rear tandem axle wheel assembly 116 of the vehicle 2. As illustrated in FIG. 1 of the disclosure and as a non-limiting example, at least a portion of a second end portion 118 of the second rear tandem axle half shaft 106 is drivingly connected to an end of the rear tandem axle system differential assembly 102 opposite the first rear tandem axle half shaft 104. It is within the scope of this disclosure and as a non-limiting example that the second end portion 118 of the second rear tandem axle half shaft 106 may be drivingly connected to a rear tandem differential side gear, a separate stub shaft, a separate coupling shaft, a second rear tandem axle differential output shaft, a second rear tandem axle half shaft connect and disconnect assembly and/or a shaft that is formed as part of a rear tandem differential side gear.

It is within the scope of this disclosure and as a non-limiting example that one or more of the joint assemblies 30, 62 and/or 98 of the vehicle 2 may be a joint assembly according to an embodiment of the disclosure.

FIG. 2 is a schematic top-plan view of another vehicle 200 having one or more joint assemblies according to an embodiment of the disclosure. The vehicle 200 illustrated in FIG. 2 is the same as the vehicle 2 illustrated in FIG. 1 except where specifically noted below. As illustrated in FIG. 2 of the disclosure and as a non-limiting example, the vehicle 200 does not include the use of the transfer case 12 that is drivingly connected to at least a portion of the front axle system differential assembly 34.

In accordance with the embodiment of the disclosure illustrated in FIG. 2 and as a non-limiting example, at least a portion of the end of the transmission output shaft 8, opposite the transmission 6, is drivingly connected to an end of the third joint assembly 58 opposite the second shaft 54 of the vehicle 200. As a result, in accordance with the embodiment of the disclosure illustrated in FIG. 2 and as a non-limiting example, the second shaft 54 of the vehicle 200 extends from the transmission output shaft 8 toward the inter-axle differential assembly 66 of the forward tandem axle system 52 of the vehicle 200.

It is within the scope of this disclosure and as a non-limiting example that one or more of the joint assemblies 62 and/or 98 of the vehicle 200 may be a joint assembly according to an embodiment of the disclosure.

FIG. 3 is a schematic top-plan view of yet another vehicle 300 having one or more joint assemblies according to an embodiment of the disclosure. As illustrated in FIG. 3 of the disclosure and as a non-limiting example, the vehicle 300 has an engine 304 which is drivingly connected to a transmission 306. As non-limiting example, the engine 304 of the vehicle 300 may be an internal combustion engine, an electric motor, a steam turbine and/or a gas turbine. A transmission output shaft 308 is then drivingly connected to an end of the transmission 306 opposite the engine 304. The transmission 306 is a power management system which provides controlled application of the rotational power generated by the engine 304 by means of a gear box.

The transmission output shaft 308 is drivingly connected to a transmission input shaft 310 which in turn is drivingly connected to a transfer case 312. The transfer case 312 is used in four-wheel drive and/or all-wheel-drive (AWD) vehicles to transfer the rotational power from the transmission 306 to a front axle system 314 and a rear axle system 316 by utilizing a series of gears and drive shafts. Additionally, the transfer case 312 allows the vehicle 300 to selectively operate in either a two-wheel drive mode of a four-wheel/AWD drive mode. As illustrated in FIG. 3 of the disclosure and as a non-limiting example, the transfer case 312 includes a first transfer case output shaft 318 and a second transfer case output shaft 320.

At least a portion of an end of the first transfer case output shaft 318, opposite the transfer case 312, is drivingly connected to at least a portion of an end of a first joint assembly 322. It is within the scope of this disclosure and as a non-limiting example that the first joint assembly 322 may be a universal coupling assembly, a U-joint assembly, a cardan joint assembly, a double cardan joint assembly, a Spicer joint assembly, a Hardy Spicer Joint assembly, a Hooke's joint assembly, a constant velocity joint assembly, a CV joint assembly or a homokinetic joint assembly.

Extending from the first transfer case output shaft 318 toward the front axle system 314 of the vehicle 300 is a first shaft 324 having a first end portion 326 and a second end portion 328. The first shaft 324 transmits the rotational power from the transfer case 312 to the front axle system 314 of the vehicle 300 thereby drivingly connecting the transfer case 312 to the front axle system 314. At least a portion of the second end portion 328 of the first shaft 324 is drivingly connected to an end of the first joint assembly 322 opposite the first transfer case output shaft 318 of the vehicle 300. It is within the scope of this disclosure and as a non-limiting example that the first shaft 324 may be a drive shaft, a propeller shaft, a Cardan shaft or a double Cardan shaft.

As illustrated in FIG. 3 of the disclosure and as a non-limiting example, at least a portion of a second end portion 326 of the first shaft is drivingly connected to an end of a second joint assembly 330. It is within the scope of this disclosure and as a non-limiting example that the second joint assembly 330 may be a universal coupling assembly, a U-joint assembly, a cardan joint assembly, a double cardan joint assembly, a Spicer joint assembly, a Hardy Spicer Joint assembly, a Hooke's joint assembly, a constant velocity joint assembly, a CV joint assembly or a homokinetic joint assembly.

Drivingly connected to an end of the second joint assembly 330, opposite the first shaft 324, is an end of a front axle system input shaft 332. The front axle system input shaft 332 drivingly connects the first shaft 324 to a front axle system differential assembly 334 of the front axle system 314 of the vehicle 300. As illustrated in FIG. 3 of the disclosure and as a non-limiting example, at least a portion of an end of the front axle system input shaft 332, opposite the first shaft 324, is drivingly connected to the front axle system differential assembly 334. It is within the scope of this disclosure and as a non-limiting example that the front axle system input shaft 332 may be front differential input shaft, a coupling shaft, stub shaft or a front differential pinion shaft. The front axle system differential assembly 334 is a set of gears that allows the outer drive wheel(s) of the vehicle 300 to rotate at a faster rate that the inner drive wheel(s). The rotational power is transmitted through the front axle system 314 as described in more detail below.

The front axle system 314 further includes a first front axle half shaft 336 and a second front axle half shaft 338. As illustrated in FIG. 3 of the disclosure and as a non-limiting example, the first front axle half shaft 336 extends substantially perpendicular to the front axle system input shaft 332 of the vehicle 300. At least a portion of a first end portion 340 of the first front axle half shaft 336 is drivingly connected to a first front axle wheel assembly 342 and at least a portion of a second end portion 344 of the first front axle half shaft 336 is drivingly connected to an end of the front axle system differential assembly 334. It is within the scope of this disclosure and as a non-limiting example that the second end portion 344 of the first front axle half shaft 336 may be drivingly connected to a front differential side gear, a separate stub shaft, a separate coupling shaft, a first front axle differential output shaft, a first front axle half shaft connect and disconnect assembly and/or a shaft that is formed as part of a front differential side gear.

Extending substantially perpendicular to the front axle system input shaft 332 is the second front axle half shaft 338 of the vehicle 300. At least a portion of a first end portion 346 of the second front axle half shaft 338 is drivingly connected to a second front axle wheel assembly 348 of the vehicle 300. As illustrated in FIG. 3 of the disclosure and as a non-limiting example, at least a portion of a second end portion 350 of the second front axle half shaft 338 is drivingly connected to an end of the front axle system differential assembly 334 opposite the first front axle half shaft 336. It is within the scope of this disclosure and as a non-limiting example that the second end portion 350 of the second front axle half shaft 338 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

An end of the second transfer case output shaft 320 is drivingly connected to an end of the transfer case 312 opposite the transfer case input shaft 310. Extending from the second transfer case output shaft 320 toward rear axle system 316 of the vehicle 300 is a second shaft 352. It is within the scope of this disclosure and as a non-limiting example that the second shaft 352 of the vehicle 300 may be a drive shaft, a propeller shaft, a Cardan shaft or a double Cardan shaft.

As illustrated in FIG. 3 of the disclosure and as a non-limiting example, at least a portion of a first end portion 354 of the second shaft 352 is drivingly connected to an end of a third joint assembly 356. Drivingly connected to an end of the third joint assembly 356, opposite the second shaft 352, is an end of the second transfer case output shaft 320 opposite the transfer case 312. It is within the scope of this disclosure and as a non-limiting example that the third joint assembly 356 may be a universal coupling assembly, a U-joint assembly, a cardan joint assembly, a double cardan joint assembly, a Spicer joint assembly, a Hardy Spicer Joint assembly, a Hooke's joint assembly, a constant velocity joint assembly, a CV joint assembly or a homokinetic joint assembly.

At least a portion of a second end portion 358 of the second shaft 352 is a fourth joint assembly 360. It is within the scope of this disclosure and as a non-limiting example that the fourth joint assembly 360 of the vehicle 300 may be a may be a universal coupling assembly, a U-joint assembly, a cardan joint assembly, a double cardan joint assembly, a Spicer joint assembly, a Hardy Spicer Joint assembly, a Hooke's joint assembly, a constant velocity joint assembly, a CV joint assembly or a homokinetic joint assembly.

Drivingly connected to an end of the fourth joint assembly 360, opposite the second shaft 352, is a rear axle system input shaft 362. The rear axle system input shaft 362 extends from the second shaft 352 toward the rear axle system 316 thereby drivingly connecting the transfer case 312 to the rear axle system 316 of the vehicle 300. It is within the scope of this disclosure and as a non-limiting example that the rear axle system input shaft 362 may be a rear axle differential input shaft, a coupling shaft, stub shaft or a rear axle differential pinion shaft. Drivingly connected to an end of the rear axle input shaft 362, opposite the second shaft 352, is a rear axle system differential assembly 364 of the rear axle system 316 of the vehicle 300. The rear axle system differential assembly 364 is a set of gears that allows the outer drive wheel(s) of the vehicle 300 to rotate at a faster rate than the inner drive wheel(s). The rotational power is transmitted through the rear axle system 316 as described in more detail below.

As illustrated in FIG. 3 of the disclosure and as a non-limiting example, the rear axle system 316 further includes a first rear axle half shaft 366 and a second rear axle half shaft 368. The first rear axle half shaft 366 extends substantially perpendicular to the rear axle system input shaft 362 of the vehicle 300. At least a portion of a first end portion 370 of the first rear axle half shaft 366 is drivingly connected to a first rear axle wheel assembly 372 and at least a portion of a second end portion 374 of the first rear axle half shaft 366 is drivingly connected to an end of the rear axle system differential assembly 364. It is within the scope of this disclosure and as a non-limiting example that the second end portion 374 of the first rear axle half shaft 366 is drivingly connected to a rear axle differential side gear, a separate stub shaft, a separate coupling shaft, a first rear axle differential output shaft, a first rear axle half shaft connect and disconnect assembly and/or a shaft that is formed as part of a rear axle differential side gear.

Extending substantially perpendicular to the rear axle system input shaft 362 is the second rear axle half shaft 368 of the vehicle 300. At least a portion of a first end portion 376 of the second rear axle half shaft 368 is drivingly connected to a second rear axle wheel assembly 378 of the vehicle 300. As illustrated in FIG. 3 of the disclosure and as a non-limiting example, at least a portion of a second end portion 380 of the second rear axle half shaft 368 is drivingly connected to an end of the rear axle system differential assembly 364 opposite the first rear axle half shaft 366. It is within the scope of this disclosure and as a non-limiting example that the second end portion 380 of the second rear axle half shaft 368 may be drivingly connected to a rear differential side gear, a separate stub shaft, a separate coupling shaft, a second rear axle differential output shaft, a second rear axle half shaft connect and disconnect assembly and/or a shaft that is formed as part of a rear differential side gear.

It is within the scope of this disclosure and as a non-limiting example that one or more of the joint assemblies 330 and/or 360 of the vehicle 300 may be a joint assembly according to an embodiment of the disclosure.

FIG. 4 is a schematic top-plan view of still yet another vehicle 400 having one or more joint assemblies according to an embodiment of the disclosure. The vehicle 400 illustrated in FIG. 4 is the same as the vehicle 300 illustrated in FIG. 3, except where specifically noted below. As illustrated in FIG. 4 of the disclosure and as a non-limiting example, the vehicle 400 does not include the use of the transfer case 312 that is drivingly connected to at least a portion of the front axle system differential assembly 334.

In accordance with the embodiment of the disclosure illustrated in FIG. 4 and as a non-limiting example, at least a portion of the end of the transmission output shaft 308, opposite the transmission 306, is drivingly connected to an end of the third joint assembly 356 opposite the second shaft 352 of the vehicle 300. As a result, in accordance with the embodiment of the disclosure illustrated in FIG. 4 and as a non-limiting example, the second shaft 352 of the vehicle 400 extends from the transmission output shaft 308 toward the rear axle system differential assembly 364 of the rea axle system 316 of the vehicle 400.

It is within the scope of this disclosure and as a non-limiting example that the fourth joint assembly 360 of the vehicle 400 may be a joint assembly according to an embodiment of the disclosure.

Figure 5A:
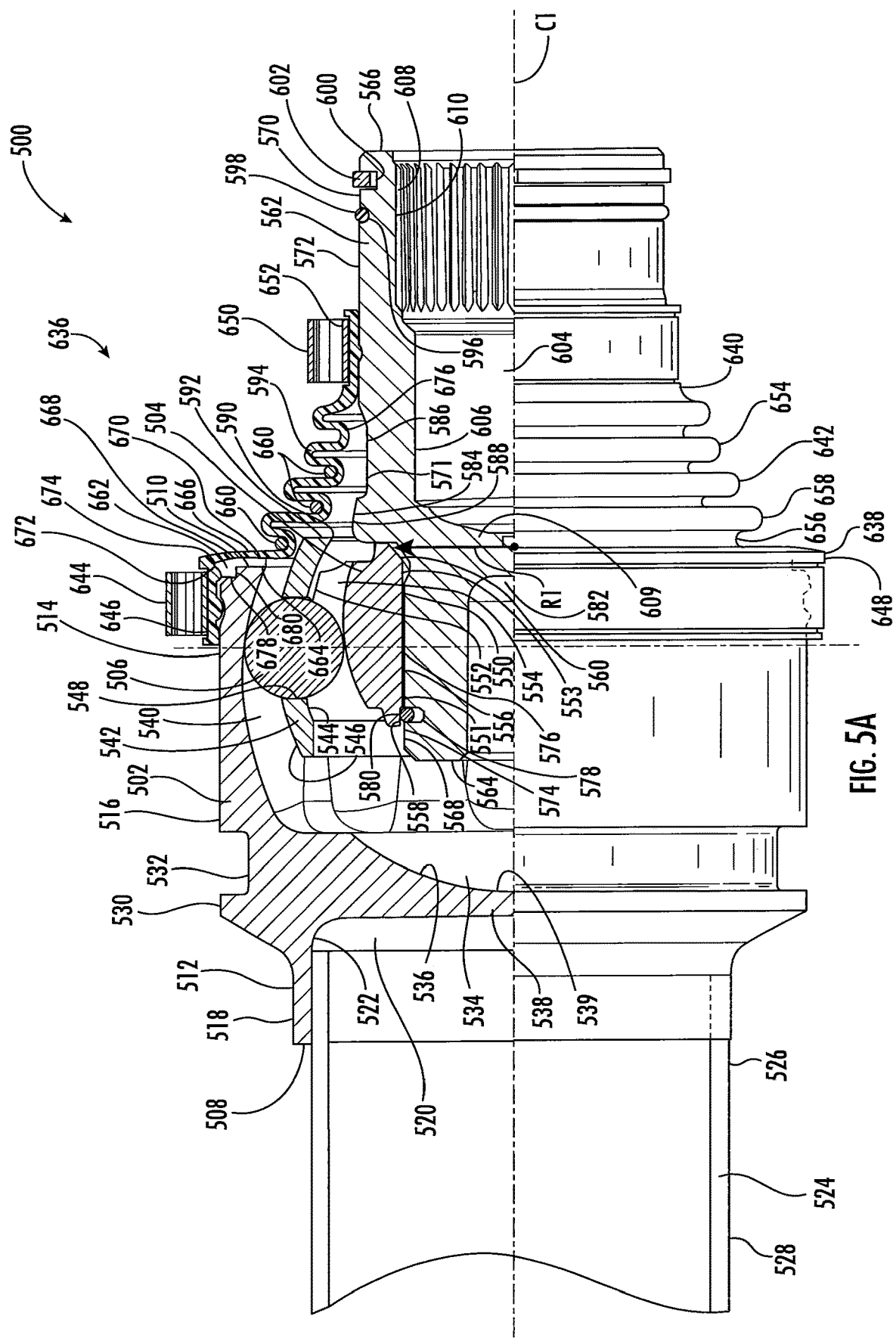
FIG. 5A is a partial cut-away schematic side-view of a portion of the joint assembly illustrated in FIG. 5 of the disclosure.
Figure 5B:
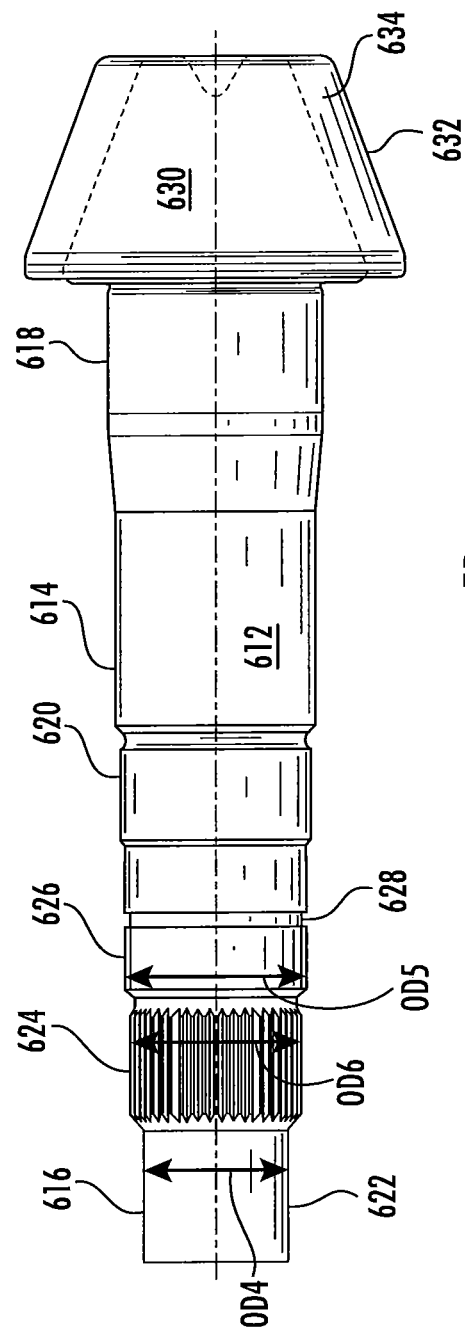
FIG. 5B is a schematic side-view of a portion of the joint assembly illustrated in FIGS. 5 and 5A of the disclosure.

FIGS. 5-5B provide a schematic illustration of a joint assembly 500 according to an embodiment of the disclosure. As illustrated in FIGS. 5 and 5A of the disclosure and as a non-limiting example, the joint assembly 500 has a first joint member 502 that is drivingly connected to a second joint member 504 via one or more third joint members 506. It is within the scope of this disclosure and as a non-limiting example that the joint assembly 500 may be a constant velocity joint assembly, a CV joint assembly, a homokinetic joint assembly or a direct pinion mount constant velocity joint assembly.

As best seen in FIG. 5A of the disclosure and as a non-limiting example, the first joint member 502 has a first end 508, a second end 510, a first end portion 512, a second end portion 514 and an intermediate portion 516 interposed between the first and second end portions 512 and 514 of the first joint member 502. At least a portion of the first end portion 512 of the first joint member 502 of the joint assembly 500 includes a reduced diameter portion 518. In accordance with the embodiment of the disclosure illustrated in FIG. 5A and as a non-limiting example, the reduced diameter portion 518 of the first joint member 502 may be substantially cylindrical in shape. It is within the scope of this disclosure and as a non-limiting example that the first joint member 502 of the joint assembly 500 may be an outer race.

A first hollow interior portion 520 that is defined by a first inner surface 522 may extend axially inboard from at least a portion of the first end 508 of the first joint member 502 of the joint assembly 500. The first hollow interior portion 520 of the first joint member 502 has a size and shape to receive and/or retain at least a portion of a first shaft 524 having a first end portion (not shown), a second end portion 526 and an outer surface 528. As illustrated in FIGS. 5 and 5A of the disclosure and as a non-limiting example, the first shaft 524 extends co-axially with at least a portion of the first joint member 502. It is within the scope of this disclosure and as a non-limiting example that at least a portion of the second end portion 526 of the first shaft 524 may be integrally connected to at least a portion of the first end portion 512 of the first joint member 502 by using one or more mechanical fasteners, one or more welds, one or more adhesives, a spline connection and/or a threaded connection. Additionally, it is within the scope of this disclosure and as a non-limiting example that the first shaft 524 of the joint assembly 500 may be a drive shaft, a propeller shaft, a stub shaft, a coupling shaft, a pinion gear shaft, a transmission output shaft, a transfer case input shaft, a transfer case output shaft, a power transfer unit input shaft, a power transfer unit output shaft, a differential input shaft, a front axle system input shaft, a forward tandem axle system input shaft, an inter-axle differential input shaft, an inter-axle differential output shaft, a rear tandem axle system input shaft or an axle half shaft.

The first joint member 502 may include one or more first joint member tool grooves 532 circumferentially extending along at least a portion of an outer surface 530 of the intermediate portion 516 of the first joint member 502. It is within the scope of this disclosure and as a non-limiting example that the one or more first joint member tool grooves 532 may have a size and shape to receive and/or retain at least a portion of a tool (not shown). The tool (not shown) may be used in order to aid in assembling at least a portion of the joint assembly 500.

A second hollow interior portion 534 defined by a second inner surface 536 may extend axially inward from at least a portion of the second end 510 of the first joint member 502 of the joint assembly 500. The second hollow interior portion 534 of the first joint member 502 may be of a size and shape to receive and/or retain at least a portion of the second joint member 504 and the third joint member 506 of the joint assembly 500. Interposed between the first hollow interior portion 520 and the second hollow interior portion 534 of the first joint member 502 of the joint assembly 500 is a wall portion 538. The wall portion 538 of the first joint member 502 may provide a physical separation between at least a portion of the first and second hollow interior portions 520 and 534 of the first joint member 502 of the joint assembly 500.

According to the embodiment of the disclosure illustrated in FIG. 5A and as a non-limiting example, the wall portion 538 of the first joint member 502 of the joint assembly 500 may further include a recessed portion 539. As best seen in FIG. 5A of the disclosure and as a non-limiting example, the recessed portion 539 extends along at least a portion of the wall portion 538 of the first joint member 502 defined by the second inner surface 536 of the second hollow interior portion 534 of the first joint member 502. The recessed portion 539 of the wall portion 538 may be of a size and shape to accommodate the articulation motion of the fourth joint member 542 of the joint assembly 500 when in operation. It is within the scope of this disclosure and as a non-limiting example that the recessed portion 539 of the wall portion 538 may be substantially arcuate in shape and defined by a substantially constant radius from a centerline C1 of the joint assembly 500.

In accordance with an embodiment of the disclosure (not shown) and as a non-limiting example, the wall portion 538 of the joint assembly 500 may include the use of a wall portion aperture (not shown). The wall portion aperture (not shown) in the wall portion 538 of the joint assembly 500 aids in the venting and/or relieving an amount of pressure that builds up within the joint assembly 500 during operation. It is within the scope of this disclosure and as a non-limiting example that the wall portion aperture (not shown) may be of a size and shape to receive and/or retain at least a portion of a vent member (not shown). The vent member (not shown) allows for the venting and/or relieving of an amount of pressure from within the joint assembly 500 during operation while preventing the release of an amount of lubrication fluid (not shown) from within the joint assembly 500.

Circumferentially extending along at least a portion of the second inner surface 536 of the second hollow interior portion 534 of the first joint member 502 is one or more first joint member grooves 540. The one or more first joint member grooves 540 have a size and/or shape to receive and/or retain at least a portion of one or more of the one or more third joint members 506 of the joint assembly 500. As a non-limiting example, the one or more third joint members 506 of the joint assembly 500 may be one or more balls, one or more rolling elements, one or roller bearings and/or one or more torque transfer elements. It is therefore to be understood that the one or more first joint member grooves 540 of the first joint member 502 aid in drivingly connecting the first joint member 502 to the second and third joint member 504 and 506 of the joint assembly 500.

At least a portion of a fourth joint member 542 having an inner surface 544 and an outer surface 546 may be interposed between the first joint member 502 and the second joint member 504 of the joint assembly 500. As best seen in FIG. 5A of the disclosure and as a non-limiting example, at least a portion of the fourth joint member 542 is disposed within at least a portion of the second hollow interior portion 534 of the first joint member 502. Extending from the inner surface 544 to the outer surface 546 of the fourth joint member 542 one or more fourth joint member apertures 548. The one or more fourth joint member apertures 548 have a size and shape to receive and/or retain at least a portion of one or more of the one or more third joint members 506 of the joint assembly 500. It is within the scope of this disclosure and as a non-limiting example that the fourth joint member 542 of the joint assembly 500 may be a cage.

Disposed radially inboard from at least a portion of the fourth joint member 542 of the joint assembly 500 is the second joint member 504 having inner surface 550, an outer surface 552, a first end portion 551 and a second end portion 553. As best seen in FIGS. 5 and 5A of the disclosure and as a non-limiting example, at least a portion of the second joint member 504 may be disposed within the second hollow interior portion 534 of the first joint member 502 of the joint assembly 500. It is within the scope of this disclosure and as a non-limiting example that the second joint member 504 of the joint assembly 500 may be an inner race.

Circumferentially extending along at least a portion of the outer surface 552 of the second joint member 504 of the joint assembly 500 is one or more second joint member grooves 554. The one or more second joint member grooves 554 on the outer surface 552 of the second joint member 504 are complementary to the one or more first joint member grooves 540 on the second inner surface 536 defining the second hollow interior portion 534 of the first joint member 502. As best seen in FIG. 5A of the disclosure and as a non-limiting example, the one or more second joint member grooves 554 are of a size and shape to receive and/or retain at least a portion of one or more of the one or more third joint member 506 of the joint assembly 500. It is therefore to be understood that the one or more second joint member grooves 554 aid in drivingly connecting the second joint member 504 to the first and third joint members 502 and 506 of the joint assembly 500.

In accordance with the embodiment of the disclosure illustrated in FIG. 5A and as a non-limiting example, a plurality of axially extending second joint member splines 556 circumferentially extend from at least a portion of the inner surface 550 of the second joint member 504. A second joint member retaining member groove 558 may circumferentially extend along at least a portion of the inner surface 550 of the second joint member 504 of the joint assembly 500. As illustrated in FIG. 5A of the disclosure and as a non-limiting example, at least a portion of the second joint member retaining member groove 558 may be disposed within the plurality of axially extending second joint member splines 556 on the inner surface 550 of the first end portion 551 of the second joint member 504.

A lead-in chamfer portion 560 may circumferentially extend along at least a portion of the second end portion 553 of the inner surface 550 of the second joint member 504. As best seen in FIG. 5A of the disclosure and as a non-limiting example, the lead-in chamfer portion 560 has a radius R1 from the centerline C1 of the joint assembly 500 that increases from a first end to a second end of the lead-in chamfer portion 560 of the second joint member 504.

Extending co-axially with and drivingly connected to at least a portion of the second joint member 504 is a second shaft 562 of the joint assembly 500. As best seen in FIG. 5A of the disclosure and as a non-limiting example, the second shaft 562 has a first end 564, a second end 566, a first end portion 568, a second end portion 570 and an intermediate portion 571 interposed between the first and second end portions 568 and 570 of the second shaft 562. It is within the scope of this disclosure and as a non-limiting example that the second shaft 562 may be a stub shaft, a coupling shaft, a drive sleeve, drive shaft, a propeller shaft, a pinion gear shaft, a transmission output shaft, a transfer case input shaft, a transfer case output shaft, a power transfer unit input shaft, a power transfer unit output shaft, a differential input shaft, a front axle system input shaft, a forward tandem axle system input shaft, an inter-axle differential input shaft, an inter-axle differential output shaft, a rear tandem axle system input shaft or an axle half shaft.

At least a portion of the first end portion 568 of the second shaft 562 has a reduced diameter portion 574. Circumferentially extending along at least a portion of an outer surface 572 of the reduced diameter portion 574 of the first end portion 568 of the second shaft 562 is a plurality of axially extending second shaft splines 576. The plurality of axially extending second shaft splines 576 of the second shaft 562 are complementary to and meshingly engaged with the plurality of axially extending second joint member splines 556 circumferentially extend from at least a portion of the inner surface 550 of the second joint member 504. It is within the scope of this disclosure and as a non-limiting example that the reduced diameter portion 574 of the second shaft 562 may be substantially cylindrical in shape.

Circumferentially extending along at least a portion of the outer surface 572 of the reduced diameter portion 574 of the second shaft 562 is a first retaining member groove 578. The first retaining member groove 578 in the second shaft 562 is complementary to and aligned with the second joint member retaining member groove 558 in the second joint member 504. The first retaining member groove 578 and the second joint member retaining member groove 558 may be of a size and shape to receive and/or retain at least a portion of a first retaining member 580. It is to be understood that the first retaining member 580 of the joint assembly 500 may aid in axially securing the second shaft 562 to the second joint member 504 of the joint assembly 500. It is within the scope of this disclosure and as a non-limiting example that the first retaining member 580 may be a snap-ring, a circlip, a C-clip, a jesus clip or a seeger ring.

A first hollow interior portion 582 may extend inward from at least a portion of the first end 564 of the second shaft 562. The first hollow interior portion 582 of the second shaft 562 may aid in reducing the overall weight and costs associated with the joint assembly 500. It is within the scope of this disclosure and as a non-limiting example that the first hollow interior portion 582 of the second shaft 562 may be substantially cylindrical in shape.

In accordance with the embodiment illustrated in FIGS. 5 and 5B of the disclosure and as a non-limiting example, the second shaft 562 may include an abutment portion 584. The abutment portion 584 may circumferentially extend along at least a portion of the outer surface 572 of the intermediate portion 571 of the second shaft 562 of the joint assembly 500. The abutment portion 584 may be used in order to prevent over articulation of the joint assembly 500 thereby aiding in increasing the overall life and durability of the joint assembly 500. In accordance with the embodiment of the disclosure illustrated in FIG. 5A and as a non-limiting example, the abutment portion 584 may be disposed directly adjacent to and may be in direct contact with at least a portion of the second end portion 553 of the second joint member 504 of the joint assembly 500. It is within the scope of this disclosure that the abutment portion 584 of the second shaft 562 may be hardened and/or heat-treated to increase the overall life and durability of the second shaft 562. As a non-limiting example, the abutment portion 584 of the second shaft 584 may be hardened and/or heat-treated by using one or more carburizing and/or induction hardening processes.

As best seen in FIG. 5 and as a non-limiting example, the reduced diameter portion 574 of the first end portion 568 of the second shaft 562 may have an outer diameter OD1 that is less than an outer diameter OD2 of the abutment portion 584 of the second shaft 562. Additionally, as best seen in FIG. 5 and as a non-limiting example, the outer diameter OD2 of the abutment portion 584 may be greater than an outer diameter OD3 of the second end portion 570 of the second shaft 562 of the joint assembly 500. Furthermore, it is within the scope of this disclosure and as a non-limiting example that the outer diameter OD3 of the second end portion 570 of the second shaft 562 may be greater than the outer diameter OD1 of the first end portion 568 of the second shaft 562 of the joint assembly 500.

A stepped portion 586 may be disposed axially outboard from and directly adjacent to the abutment portion 584 of the intermediate portion 571 of the second shaft 562 of the joint assembly 500. As best seen in FIG. 5 of the disclosure and as a non-limiting example, the stepped portion 586 of the second shaft 562 may have an outer diameter OD4 that is less than the outer diameter OD2 of the abutment portion 584 of the second shaft 562. Additionally, as illustrated in FIG. 5 of the disclosure and as a non-limiting example, the outer diameter OD4 of the stepped portion 586 of the second shaft 562 of the joint assembly 500 may be less than the outer diameter OD3 of the second end portion 570 of the second shaft 562. Furthermore, as illustrated in FIG. 5 of the disclosure, the outer diameter OD4 of the stepped portion 586 of the second shaft 562 may be greater than the outer diameter OD1 of the first end portion 568 of the second shaft 562 of the joint assembly 500.

When the joint assembly 500 is articulated to the maximum joint angle (not shown), a contact surface 588 of the abutment portion 584 on the intermediate portion 571 of the second shaft 562 may be in direct contact with at least a portion of the fourth joint member 542 of the joint assembly 500. In accordance with an embodiment of the disclosure, when the joint assembly 500 is articulated to the maximum joint angle (not shown), at least a portion of the contact surface 588 of the abutment portion 584 of the second shaft 562 may be in direct contact with an opening 590 of an axially outermost edge 592 of the fourth joint member 542. As a result, the abutment portion 584 of the second shaft 562 may act as a stopper to prevent the joint assembly 500 from being articulated beyond the maximum joint angle (not shown) thereby preventing a flexible boot 594 of the joint assembly 500 from being over compressed. This will aid in increasing the overall life and durability of the flexible boot 594 and the joint assembly 500 as a whole.

Additionally, when the joint assembly 500 is articulated to the maximum joint angle (not shown), the stepped portion 586 may provide the additional space needed in order to ensure that the flexible boot 594 does not come into direct contact with the second shaft 562. As a result, it is therefore to be understood that the stepped portion 586 of the second shaft 562 further aids in increasing the overall life and durability of the flexible boot 594 and the joint assembly 500.

A second shaft sealing member groove 596 may circumferentially extend along at least a portion of the outer surface 572 of the second end portion 570 of the second shaft 562. The second shaft sealing member groove 596 on the outer surface 572 of the second end portion 570 of the second shaft 562 may be of a size and shape to receive and/or retain at least a portion of a first sealing member 598. It is within the scope of this disclosure and as a non-limiting example that the first sealing member 598 of the joint assembly 500 may be an O-ring or any other sealing member that is able to sealingly engage a plurality of surfaces.

Disposed axially outboard from and adjacent to the second shaft sealing member groove 596 of the second shaft 562 is a second retaining member groove 600. As best seen in FIG. 5A of the disclosure and as a non-limiting example, the second retaining member groove 600 may circumferentially extend along at least a portion of the outer surface 572 of the second end portion 570 of the second shaft 562 of the joint assembly 500. The second retaining member groove 600 may be of a size and shape to receive and/or retain at least a portion of a second retaining member 602. It is within the scope of this disclosure and as a non-limiting example that the second retaining member 602 of the joint assembly 500 may be a snap-ring, a circlip, a C-clip, a jesus clip or a seeger ring.

As best seen in FIG. 5A of the disclosure and as a non-limiting example, a second hollow interior portion 604 may extend axially inboard from at least a portion of the second end 566 of the second shaft 562 of the joint assembly 500. In accordance with the embodiment illustrated in FIGS. 5 and 5A and as a non-limiting example, the second hollow interior portion 604 of the second shaft 562 may be defined by a first inner surface 606 having a diameter D1 and a second inner surface 608 having a diameter D2. It is within the scope of this disclosure and as a non-limiting example that the diameter D1 of the first inner surface 606 of the second hollow interior portion 604 of the second shaft 562 may be less than the diameter D2 of the second inner surface 608 of the second hollow interior portion 604 of the second shaft 562.

A wall portion 609 may be interposed between the first hollow interior portion 582 and the second hollow interior portion 604 of the second shaft 562. As best seen in FIG. 5A of the disclosure and as a non-limiting example, the wall portion 609 of the second shaft 562 separates the first hollow interior portion 582 from the second hollow interior portion 604 of the second shaft 562 of the joint assembly 500. It is within the scope of this disclosure that the wall portion 609 of the second shaft 562 may be substantially solid or include one or more apertures (not shown). According to the embodiment where the wall portion 609 has one or more apertures (not shown), the one or more apertures (not shown) may provide fluid communication between the second hollow interior portion 534 of the first joint member 502, the first hollow interior portion 582 of the second shaft 562 and/or the second hollow interior portion 604 of the second shaft 562. This may aid in venting an amount of pressure generated within the joint assembly 500 when in operation thereby aiding in increasing the overall life and durability of the joint assembly 500.

In accordance with the embodiment illustrated in FIGS. 5 and 5A of the disclosure and as a non-limiting example, the second shaft 562 may include a plurality of axially extending second shaft splines 610. The plurality of axially extending second shaft splines 610 may circumferentially extend along at least a portion of the second inner surface 608 of the second hollow interior portion 604 of the second shaft 562.

Extending co-axially with and drivingly connected to at least a portion of the second shaft 562 is a third shaft 612 of the joint assembly 500. As best seen in FIGS. 5 and 5B of the disclosure and as a non-limiting example, the third shaft 612 of the joint assembly 500 has an outer surface 614, a first end portion 616, a second end portion 618 and an intermediate portion 620 interposed between the first and second end portions 616 and 618 of the third shaft 612. At least a portion of the first end portion 616 of the third shaft 612 may be drivingly connected to at least a portion of the second shaft 562 of the joint assembly 500. It is within the scope of this disclosure and as a non-limiting example that the third shaft 612 of the joint assembly 500 may be a pinion gear shaft, a stub shaft, a coupling shaft, a drive sleeve, drive shaft, a propeller shaft, a pinion gear shaft, a transmission output shaft, a transfer case input shaft, a transfer case output shaft, a power transfer unit input shaft, a power transfer unit output shaft, a differential input shaft, a front axle system input shaft, a forward tandem axle system input shaft, an inter-axle differential input shaft, an inter-axle differential output shaft, a rear tandem axle system input shaft or an axle half shaft.

At least a portion of the first end portion 616 of the third shaft 612 of the joint assembly 500 may have a reduced diameter portion 622. The reduced diameter portion 622 of the first end portion 616 of the third shaft 612 may have an outer diameter OD4 that is substantially equal to or less than the diameter D1 of the first inner surface 606 of the second hollow interior portion 604 of the second shaft 562. When the joint assembly 500 is assembled, at least a portion of the reduced diameter portion 622 of the third shaft 612 is received and/or retained within at least a portion of the second hollow interior portion 604 of the second shaft 562.

As best seen in FIGS. 5 and 5B of the disclosure and as a non-limiting example, the third shaft 612 may include a plurality of axially extending third shaft splines 624. The plurality of axially extending third shaft splines 624 may circumferentially extend along at least a portion of the outer surface 614 of the first end portion 616 of the third shaft 612. According to the embodiment illustrated in FIGS. 5 and 5B and as a non-limiting example, the plurality of axially extending third shaft splines 624 may be disposed axially inboard from and directly adjacent to at least a portion of the reduced diameter portion 622 of the first end portion 616 of the third shaft 612. The plurality of axially extending third shaft splines 624 may be complementary to and meshingly engaged with at least a portion of the plurality of axially extending second shaft splines 610 extending along the second inner surface 608 of the second shaft 562.

A plurality of third shaft threads 626 may circumferentially extend along at least a portion of the intermediate portion 620 of the third shaft 612. As best seen in FIGS. 5 and 5B and as a non-limiting example, the plurality of third shaft threads 626 may be disposed axially inboard from and directly adjacent to an end of the plurality of axially extending third shaft splines 624 opposite reduced diameter portion 622 of the third shaft 612. The plurality of third shaft threads 626 may have an outer diameter OD5 that is larger than an outer diameter OD6 of the plurality of axially extending third shaft splines 624 of the third shaft 612. Additionally, in accordance with the embodiment illustrated in FIG. 5B and as a non-limiting example, the outer diameters OD5 and OD6 of the plurality of third shaft threads 626 and the plurality of axially extending third shaft splines 624 of the third shaft 612 may be larger than the outer diameter OD4 of the reduced diameter portion 622 of the third shaft 612.

A third shaft sealing member groove 628 may circumferentially extend along at least a portion of the intermediate portion 620 of the third shaft 612 of the joint assembly 500. As best seen in FIGS. 5 and 5B of the disclosure and as a non-limiting example, the third shaft sealing member groove 628 may be disposed axially inboard form and directly adjacent to an end of the plurality of third shaft threads 626 opposite the plurality of axially extending third shaft splines 624 of the third shaft 612. The third shaft sealing member groove 628 may be of a size and shape needed in order to receive and/or retain at least a portion of a second sealing member (not shown). It is within the scope of this disclosure and as a non-limiting example that the second sealing member (not shown) of the joint assembly 500 may be an O-ring or any other sealing member that is able to sealingly engage a plurality of surfaces.

In accordance with the embodiment illustrated in FIG. 5B of the disclosure and as a non-limiting example, a gear 630 may be connected to at least a portion of the second end portion 618 of the third shaft 612. Circumferentially extending from at least apportion of an outer surface 632 of the gear 630 is a plurality of gear teeth 634. The plurality of gear teeth 634 on the outer surface 632 of the gear 630 may be complementary to and meshingly engaged with a plurality of ring gear teeth (not shown) circumferentially extending from an outer surface of a ring gear (not shown) of a differential assembly (not shown). It is within the scope of this disclosure and as a non-limiting example that the gear 630 may be a pinion gear.

According to an embodiment of the disclosure and as a non-limiting example, at least a portion of the gear 630 may be integrally formed as part of the second end portion 618 of the third shaft 612 of the joint assembly 500. In accordance with an alternative embodiment of the disclosure and as a non-limiting example, at least a portion of the gear 630 may be drivingly connected to at least a portion of the second end portion 618 of the third shaft 612. It is within the scope of this disclosure and as a non-limiting example that the gear 630 may be drivingly connected to the second end portion 618 of the third shaft 612 by using one or more welds, one or more mechanical fasteners, one or more adhesives, a spline connection and/or a threaded connection.

In accordance with the embodiment illustrated in FIGS. 5 and 5B and as a non-limiting example, the third shaft 612 may include, in axial order, from the first end portion 616 to the second end portion 618 of the third shaft 612 the reduced diameter portion 622, the plurality of axially extending third shaft splines 624, the plurality of third shaft threads 626 and the third shaft sealing member groove 628.

Disposed radially outboard from at least a portion of the second shaft 562 and/or the first joint member 502 of the joint assembly 500 is a flexible boot assembly 636. As best seen in FIGS. 5 and 5A of the disclosure and as a non-limiting example, the flexible boot assembly 636 includes the flexible boot 594. The flexible boot 594 of the boot assembly 636 may have a first end portion 638, a second end portion 640 and an intermediate portion 642 interposed between the first and second end portion 638 and 640 of the flexible boot 594. As illustrated in FIGS. 5 and 5A of the disclosure and as a non-limiting example, the flexible boot 594 may constructed of a single unitary piece. It is within the scope of this disclosure and as a non-limiting example that the flexible boot 594 may be made of a thermoplastic material, a polymeric material, a rubber material and/or a similar elastomeric material that is able to withstand the amount of heat and pressure generated by the joint assembly 500 during operation, as well as the various environmental conditions the flexible boot 594 is exposed to.

As best seen in FIG. 5A of the disclosure and as a non-limiting example, at least a portion of the first end portion 638 of the flexible boot 594 may be connected to at least a portion of the outer surface 530 of the second end portion 514 of the first joint member 502 of the joint assembly 500. Additionally, as best seen in FIG. 5A and as a non-limiting example, at least a portion of the second end portion 640 of the flexible boot 594 may be connected to at least a portion of the outer surface 572 of the second shaft 562. It is within the scope of this disclosure and as a non-limiting example that the second end portion 640 of the flexible boot 594 may be connected to at least a portion of the outer surface 574 of the second shaft 562 at a point between the stepped portion 586 and the second shaft sealing member groove 596. In light of the foregoing, it is therefore to be understood that the flexible boot 594 may be used in order to aid in preventing the migration of dirt, debris and/or moisture into the joint assembly 500 thereby improving the overall life and durability of the joint assembly 500.

In accordance with the embodiment illustrated in FIGS. 5 and 5A and as a non-limiting example, the first end portion 638 of the flexible boot 594 may be connected to the second end portion 514 of the first joint member 502 by using a first boot retention member 644. The first boot retention member 644 of the boot assembly 636 aids in ensuring that the first end portion 638 of the flexible boot 594 is secured to and sealingly engaged with at least a portion of the outer surface 530 of the second end portion 514 of the first joint member 502. Additionally, in accordance with the embodiment illustrated in FIG. 5A and as a non-limiting example, at least a portion of the first boot retention member 644 may be received and/or retained within at least a portion of a first boot retention member groove 646 circumferentially extending along at least a portion of an outer surface 648 of the first end portion 638 of the flexible boot 594. It is within the scope of this disclosure and as a non-limiting example that the first boot retention member 644 may be a boot clamp.

As illustrated in FIGS. 5 and 5A of the disclosure and as a non-limiting example, the second end portion 640 of the flexible boot 594 may be connected to the outer surface 572 of the second shaft 562 by using a second boot retention member 650. The second boot retention member 650 of the boot assembly 636 aids in ensuring that the second end portion 640 of the flexible boot 594 is secured to and sealingly engaged with at least a portion of the outer surface 572 of the second shaft 562 of the joint assembly 500. In accordance with the embodiment illustrated in FIG. 5A and as a non-limiting example, at least a portion of the second boot retention member 650 may be received and/or retained within at least a portion of a second boot retention member groove 652 circumferentially extending along at least a portion of the outer surface 648 of the second end portion 640 of the flexible boot 594. It is within the scope of this disclosure and as a non-limiting example that the second boot retention member 650 may be a boot clamp.

According to the embodiment illustrated in FIG. 5A and as a non-limiting example, the intermediate portion 642 of the flexible boot 594 may have one or more convolutions 654. The one or more convolutions 654 of the intermediate portion 642 of the flexible boot 594 may be defined by one or more valleys 656 and one or more peaks 658. It is to be understood that the one or more convolutions 654 of the flexible boot 594 aid in allowing the flexible boot 594 to flex as needed during the operation of the joint assembly 500.

The flexible boot assembly 636 may further include the use of one or more third retaining members 660. As best seen in FIGS. 5 and 5A of the disclosure and as a non-limiting example, at least a portion of the one or more third retaining members 660 may be disposed within one or more of the one or more valleys 656 of the one or more convolutions 654 of the flexible boot 594. The one or more third retaining members 660 may be used in order to radially retain the one or more valleys 656 of the flexible boot 594 thereby preventing a radial inversion of the flexible boot 594 when the joint assembly 500 is in operation. This will aid in preventing an amount of unwanted deformation to the flexible boot 594 which aids improving the overall life and durability of the flexible boot 594 and the joint assembly 500 as a whole.

In accordance with the embodiment illustrated in FIGS. 5 and 5A and as a non-limiting example, the flexible boot assembly 636 of the joint assembly 500 may further include the use of an adapter 662. The adapter 662 aids in preventing the flexible boot 594 from radially inverting when the joint assembly 500 is in operation. As a non-limiting example, the adapter 662 may be made of a thermoplastic material, a polymeric material, a rubber material and/or a similar elastomeric material. It is within the scope of this disclosure and as a non-limiting example that the adapter 662 may be made of the same material as the flexible boot 594 or the adapter 662 can be made from a different material than that of the flexible boot 594 of the joint assembly 500. Additionally, it is within the scope of this disclosure and as a non-limiting example that material of the adapter 662 may have a greater hardness than the hardness of the material of the flexible boot 594. In light of the foregoing, it is therefore to be understood that the increased hardness of the adapter 662 may further aid in preventing the flexible boot 594 from radially inverting when the joint assembly 500 is in operation thereby improving the overall life and durability of the joint assembly 500.

As best seen in FIG. 5A of the disclosure and as a non-limiting example, the adapter 662 may be a substantially disc-shaped member having a first side 664, a second side 666, a radially outboard end portion 668 and a radially inboard end portion 670. An increased diameter portion 672 may circumferentially extend, radially outboard, from at least a portion of the radially outboard end portion 668 of the adapter 662. According to the embodiment illustrated in FIG. 5A of the disclosure and as a non-limiting example, at least a portion of the increased diameter portion 672 of the adapter 662 may be received and/or retained within at least a portion of a recess 674 circumferentially extending along at least a portion of an inner surface 676 of the first end portion 638 of the flexible boot 594. The recess 674 may be of a size and shape to receive and/or retain at least a portion of the increased diameter portion 672 of the adapter 662 of the flexible boot assembly 638. When the adapter 662 is inserted within the first end portion 638 of the flexible boot 594, the flexible boot 594 may be elastically deformed radially outboard allowing the increased diameter portion 672 to be received and/or retained within the recess 674 in the flexible boot 594. This aids in securing the adapter 662 to at least a portion of the flexible boot 594 of the flexible boot assembly 638.

In accordance with an embodiment of the disclosure and as a non-limiting example, at least a portion the radially outboard end portion 668 and/or the second side 666 of the adapter 662 may be integrally connected to at least a portion of the inner surface 676 of the first end portion 638 of the flexible boot 594. According to the embodiment of the disclosure illustrated in FIG. 5A and as a non-limiting example, at least a portion of the second side 666 of the adapter 662 may be integrally connected to at least a portion of the inner surface 676 of the one or more convolutions 654 of the flexible boot 594. It is within the scope of this disclosure and as a non-limiting example that the radially outboard end portion 668 and/or the second side 666 of the adapter 662 may be integrally connected to at least a portion of the inner surface 676 of the first end portion 638 of the flexible boot 594 by using one or more welds, one or more diffusion bonds, one or more epoxies, one or more adhesives, one or more solvents and/or one or more cements.

The adapter 662 may include a first joint member mating portion 678 extending circumferentially and axially into at least a portion of the first joint member 502 from at least a portion of the first side 664 of the radially outboard end portion 668 of the adapter 662. The first joint member mating portion 678 of the adapter 662 may have a size and a shape that is complementary to and meshingly engaged with at least a portion of an adapter receiving groove 680 circumferentially extending axially inboard from at least a portion of the second end 510 of the first joint member 502. When the joint assembly 500 is articulated, at least a portion of the flexible boot 594 is compressed causing at least a portion of the first joint member mating portion 678 of the adapter 662 to become frictionally engaged with at least a portion of the adapter receiving groove 680 of the first joint member 502. The frictional engagement between the adapter receiving groove 680 of the first joint member 502 and the first joint member mating portion 678 of the adapter 662 further aids in preventing the radial inversion of the flexible boot 594 thereby aiding in increasing the overall life and durability of the flexible boot assembly 636 and/or the joint assembly 500.

As best seen in FIG. 5A of the disclosure and as a non-limiting example, the adapter 662 may be used in order to fill any gap that exists between the inner surface 676 of the first end portion 638 and/or the intermediate portion 642 of the flexible boot 594 and the outer surface 530 of the second end 510 and/or the second end portion 514 of the first joint member 502. Additionally, as best seen in FIG. 5A and as a non-limiting example, the second side 666 may have a shape that is complementary to the inner surface 676 of the flexible boot 594 and the first side 664 may have a shape that is complementary to the second end 510 of the first joint member 502 of the joint assembly 500.

According to the embodiment illustrated in FIG. 5 of the disclosure and as a non-limiting example, the joint assembly 500 may include a nut 682 having a first inner surface 684, a second inner surface 686, an outer surface 688, a first end portion 690 and a second end portion 692. At least a portion of the nut 682 may be disposed radially outboard from at least a portion of the second shaft 562 and/or the third shaft 612 of the joint assembly 500. The nut 682 may be used in order to aid in axially securing at least a portion of the third shaft 612 to at least a portion of the second shaft 562 of the joint assembly 500. As best seen in FIG. 5 of the disclosure and as a non-limiting example, the first inner surface 684 of the nut 682 may have a diameter D3 that is substantially equal to or greater than the outer diameter OD3 of the second end portion 570 of the second shaft 562. Additionally, as best seen in FIG. 5 of the disclosure and as a non-limiting example, the second inner surface 686 of the nut 682 may have a diameter D4 that is less than the diameter D3 of the first inner surface 684 of the nut 682.

The nut 682 may include a lead-in chamfer 694. As best seen in FIG. 5 of the disclosure and as a non-limiting example the lead-in chamfer 694 may circumferentially extend along at least a portion of the first end portion 690 of the first inner surface 684 of the nut 682. The lead-in chamfer 694 of the nut 682 may be used in order to aid in asserting at least a portion of the second end portion 570 of the second shaft 562 within the nut 682 of the joint assembly 500.

As best seen in FIG. 5 of the disclosure and as a non-limiting example, a nut sealing member groove 696 may circumferentially extend along at least a portion of the first inner surface 684 of the nut 682 of the joint assembly 500. At least a portion of the nut sealing member groove 696 may be disposed axially inboard from and adjacent to the lead-in chamfer 694 in the first inner surface 684 of the nut 682. The nut sealing member groove 696 may be complementary to and aligned with the second shaft sealing member groove 596 in the second shaft 562 of the joint assembly 500. The nut sealing member groove 696 may be of a size and shape to receive and/or retain at least a portion of the first sealing member 598 of the joint assembly 500. It is to be understood that the first sealing member 598 in the nut 682 may be used in order to aid in providing a sealing connection between the nut 682 and the second shaft 562 of the joint assembly 500.

A nut retaining member groove 698 may circumferentially extend along at least a portion of the first inner surface 684 of the nut 682. As best seen in FIG. 5 of the disclosure and as a non-limiting example, the nut retaining member groove 698 may be disposed axially inboard from the second shaft lead-in chamfer 694 and the nut sealing member groove 696 in the first inner surface 684 of the nut 682. The nut retaining member groove 698 may be complementary to and aligned with the second retaining member groove 600 in the outer surface 572 of the second end portion 570 of the second shaft 562. Additionally, the nut retaining member groove 698 may be of a size and shape needed in order to receive and/or retain at least a portion of the second retaining member 602 of the joint assembly 500. It is therefore to be understood that the nut retaining member groove 698 in the first inner surface 684 of the nut 682 aids in securing at least a portion of the nut 682 to at least a portion of the second end portion 570 of the second shaft 562 of the joint assembly 500.

In accordance with the embodiment illustrated in FIG. 5 of the disclosure and as a non-limiting example, a plurality of nut threads 700 may circumferentially extend along at least a portion of the second inner surface 686 of the nut 682. As illustrated in FIG. 5 and as a non-limiting example, at least a portion of the plurality of nut threads 700 may be complementary to and meshingly engaged with at least a portion of the plurality of third shaft threads 626 on the third shaft 612 of the joint assembly 500. It is therefore to be understood that the meshing engagement of the plurality of nut threads 700 of the nut 682 and the plurality of third shaft threads 626 on the third shaft 612 may be used in order to aid in securing the nut 682 to the third shaft 612. Additionally, it is to be understood that the meshing engagement between the nut threads 700 and the third shaft threads 626 may be used in order to aid in axially securing the second shaft 562 relative to the third shaft 612 of the joint assembly 500.

As best seen in FIG. 5 of the disclosure and as a non-limiting example, the nut 682 may include one or more nut tool grooves 702. The one or more nut tool grooves 702 may circumferentially extend along at least a portion of the outer surface 688 of the nut 682. In accordance with the embodiment illustrated in FIG. 5 of the disclosure and as a non-limiting example, the one or more nut tool grooves 702 may be located within the outer surface 688 of the second end portion 692 of the nut 682 at a location radially outboard from the plurality of nut threads 700. The one or more nut tool grooves 702 may have a size and shape needed to receive and/or retain at least a portion of the tool (not shown). As previously discussed, the tool (not shown) may be used in assembly of the joint assembly 500.

Figure 6:
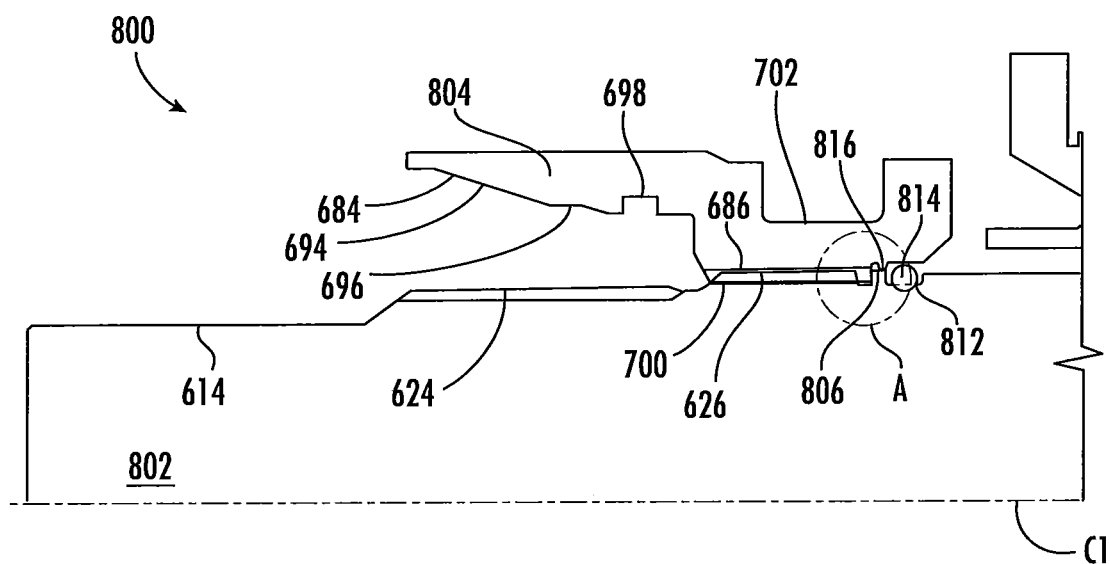
FIG. 6 is a cut-away schematic side-view of a portion of the joint assembly illustrated in FIGS. 5-5B according to an alternative embodiment of the disclosure.
Figure 6A:
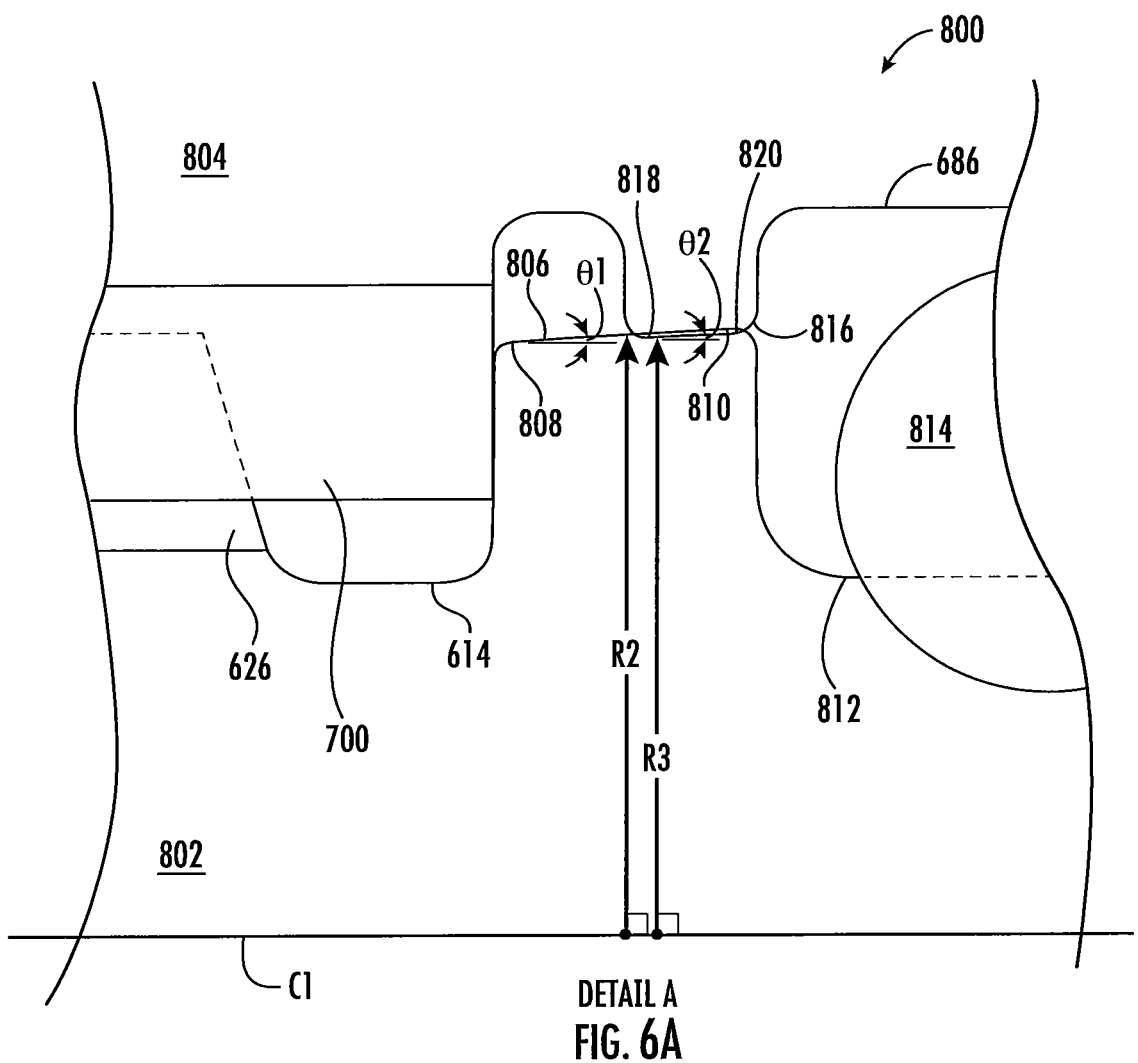
FIG. 6A is a cut-away schematic detail view of a portion of the joint assembly illustrated in FIG. 6 of the disclosure.

FIGS. 6 and 6A provide a schematic illustration of a portion of a joint assembly 800 according to an alternative embodiment of the disclosure. The joint assembly 800 illustrated in FIGS. 6 and 6A is the same as the joint assembly 500 illustrated in FIGS. 5-5B, except where specifically noted below. As illustrated in FIGS. 6 and 6A of the disclosure, the joint assembly 800 includes a third shaft 802 and a nut 804. The third shaft 802 and the nut 804 of the joint assembly 800 illustrated in FIGS. 6 and 6A is the same as the third shaft 612 and the nut 682 of the joint assembly 500 illustrated in FIGS. 5-5B, except where specifically noted below.

In accordance with the embodiment illustrated in FIGS. 6 and 6A of the disclosure and as a non-limiting example, the third shaft 802 may further include a nut stopper portion 806 having a first end portion 808 and a second end portion 810. The nut stopper portion 806 of the third shaft 802 may provide a positive stop for the nut 804 thereby aiding in preventing the nut 804 from turning off or unscrewing from the third shaft 802 when the joint assembly 800 is in operation. As a result, the nut stopper portion 806 may be used in order to aid in improving the overall life, durability and operability of the joint assembly 800. When the joint assembly 800 is assembled, at least a portion of the plurality of nut threads 700 on the second inner surface 686 of the nut 804 may be in direct contact with at least a portion of the nut stopper portion 806 of the third shaft 802.

As best seen in FIG. 6A and as a non-limiting example, the nut stopper portion 806 of the third shaft 802 may have a radius R2 from the center-line C1 of the joint assembly 800 that increases from the first end portion 808 to the second end portion 810 of the nut stopper portion 806. Additionally, as best seen in FIG. 6A and as a non-limiting example, the outer surface 614 of the nut stopper portion 806 of the third shaft 802 may increase at an angle θ1 from the first end portion 808 to the second end portion 810 of the nut stopper portion 806. It is therefore within the scope of this disclosure and as a non-limiting example that the nut stopper portion 806 of the third shaft 802 may be substantially frusto-conical in shape.

According to an embodiment of the disclosure (not shown) and as a non-limiting example, the nut stopper portion 806 of the third shaft 802 may be substantially cylindrical in shape. As a result, in accordance with this embodiment of the disclosure (not shown), the nut stopper portion 806 of the third shaft 802 does not include the radius R2 that increases from the first end portion 808 to the second end portion 810 of the nut stopper portion 806.

A third shaft sealing member groove 812 may circumferentially extend along at least a portion of the outer surface 614 of the third shaft 802 of the joint assembly 800. As illustrated in FIGS. 6 and 6A of the disclosure and as a non-limiting example, the third shaft sealing member groove 812 in the outer surface 614 of the third shaft 802 may be disposed axially inboard from and directly adjacent to the second end portion 810 of the nut stopper portion 806 of the third shaft 802. The third shaft sealing member groove 812 in the third shaft 802 may be of a size and shape to receive and/or retain at least a portion of a third sealing member 814. At least a portion of the third sealing member 814 may be sealingly engaged with the outer surface 614 of the third shaft 802 and the second inner surface 686 of the nut 804. It is therefore to be understood that the third sealing member 814 aids in sealing the threaded connection between the nut 804 and the third shaft 802 from the environment thereby preventing the migration of dirt, debris and/or moisture into the threaded connection between the nut 804 and the third shaft 802. As a non-limiting example the third sealing member 814 may be an O-ring or any other sealing member that is able to sealingly engage a plurality of surfaces.

In accordance with the embodiment illustrated in FIGS. 6 and 6A of the disclosure and as a non-limiting example, the nut 804 of the joint assembly 800 may include a reduced diameter portion 816. As best seen in FIG. 6A of the disclosure and as a non-limiting example, the reduced diameter portion 816 may circumferentially extend radially inboard from at least a portion of the second inner surface 686 of the nut 804 and may be disposed adjacent to an end of the plurality of nut threads 700 opposite the nut retaining member groove 698. When assembled, at least a portion of the reduced diameter portion 816 of the nut 804 is disposed radially outboard from at least a portion nut stopper portion 806 of the third shaft 802 of the joint assembly 800. It is to be understood that the nut stopper portion 806 and the reduced diameter portion 816 of the joint assembly 800 may aid in ensuring that the nut 804 is securely connected to the third shaft 802 thereby preventing the nut 804 from turning off or unscrewing from the third shaft 802 when the joint assembly 800 is in operation.

As best seen in FIG. 6A and as a non-limiting example, the reduced diameter portion 816 of the nut 804 may have a radius R3 from the centerline C1 of the joint assembly 800 that increases from a first end portion 818 to a second end portion 820 of the reduced diameter portion 816. The radius R3 of the reduced diameter portion 816 may be substantially equal to or less than the radius R2 of the nut stopper portion 806 of the third shaft 802. Additionally, as best seen in FIG. 6A and as a non-limiting example, the second inner surface 686 of the reduced diameter portion 816 of the nut 804 may increase at an angle θ2 from the first end portion 818 to the second end portion 820 of the nut 816. When assembled, at least a portion of the nut stopper portion 806 and/or at least a portion of the reduced diameter portion 816 will be elastically and/or plastically deformed thereby providing an interference fit between the nut stopper portion 806 and the reduced diameter portion 816. The interference fit between the nut stopper portion 806 and the reduced diameter portion 816 aids in preventing the nut 804 from turning off or unscrewing from the third shaft 802 when the joint assembly 800 is in operation. As a non-limiting example that the reduced diameter portion 816 of the nut 804 may be substantially frusto-conical in shape.

According to an embodiment of the disclosure (not shown) and as a non-limiting example, the reduced diameter portion 816 of the nut 804 may be substantially cylindrical in shape. As a result, in accordance with this embodiment of the disclosure (not shown), the reduced diameter portion 816 of the nut 804 does not include the radius R3 that increases from the first end portion 818 to the second end portion 820 of the reduced diameter portion 816.

Figure 7:
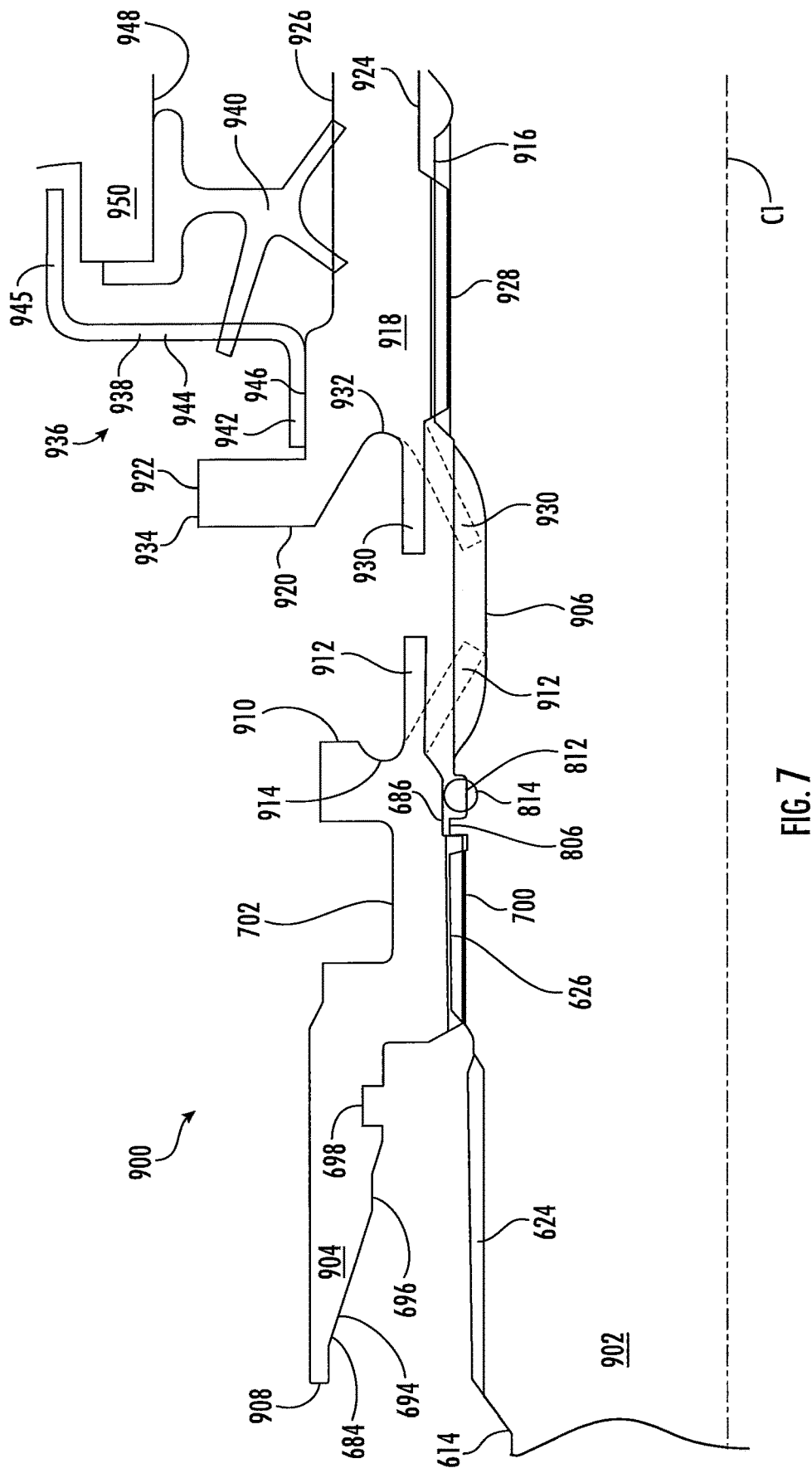
FIG. 7 is a cut-away schematic side-view of a portion of the joint assembly illustrated in FIGS. 5-6A of the disclosure according to another embodiment of the disclosure.
Figure 7A:
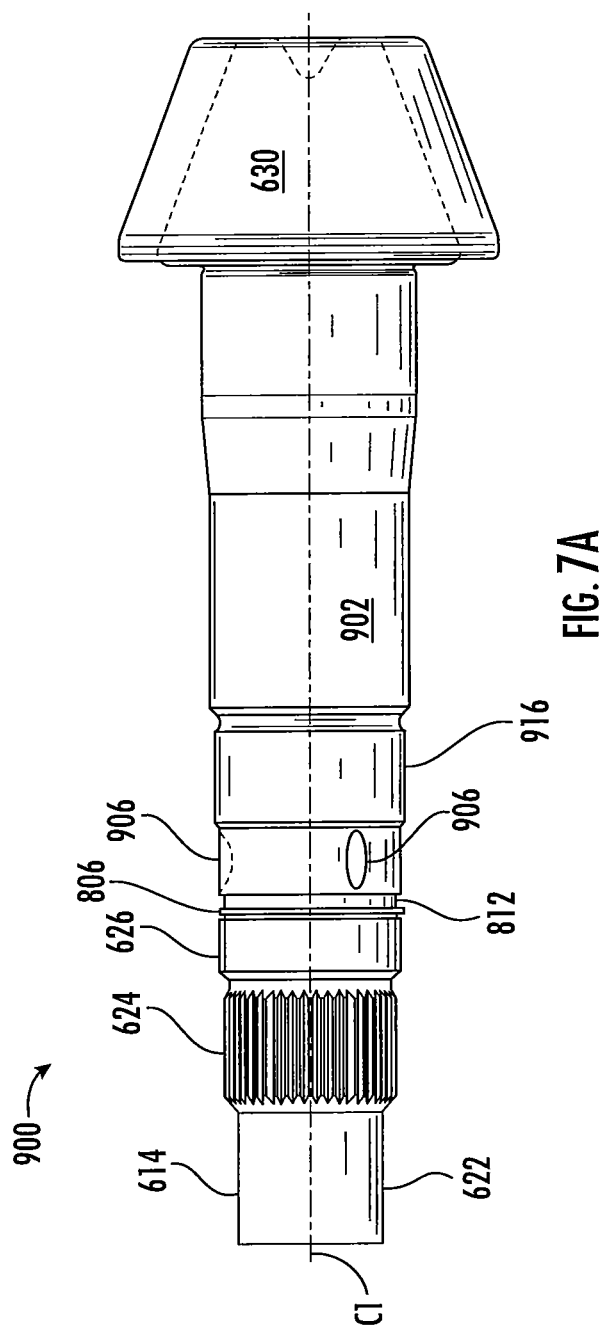
FIG. 7A is a schematic side view of a portion of the joint assembly illustrated in FIG. 7 of the disclosure.

FIGS. 7 and 7A provide a cut-away schematic side-view of a joint assembly 900 according to another embodiment of the disclosure. The joint assembly 900 illustrated in FIGS. 7 and 7A of the disclosure is the same as the joint assemblies 500 and 800 illustrated in FIGS. 5-6A, except where specifically noted below. As illustrated in FIGS. 7 and 7A of the disclosure, the joint assembly 900 includes a third shaft 902 and a nut 904. The third shaft 902 and the nut 904 of the joint assembly 900 illustrated in FIGS. 7 and 7A is the same as the third shaft 612 and 802 and the nut 682 and 804 of the joint assemblies 500 and 800 illustrated in FIGS. 5-6A, except where specifically noted below.

As illustrated in FIGS. 7 and 7A of the disclosure and as a non-limiting example, the third shaft 902 of the joint assembly 900 may include one or more staking grooves 906. The one or more staking grooves 906 in the outer surface 614 of the third shaft 902 may be disposed axially inboard from and directly adjacent to the third shaft sealing member groove 812 in the outer surface 614 of the third shaft 902 of the joint assembly 900. As best seen in FIG. 7A and as a non-limiting example, the one or more staking grooves 906 of the third shaft 902 extend axially along at least a portion of the outer surface 614 of the third shaft 902.

In accordance with the embodiment illustrated in FIG. 7 of the disclosure and as a non-limiting example, the nut 904 of the joint assembly 900 may have a first end 908 and a second end 910. One or more axially extending portions 912 may extend axially outboard from at least a portion of the second end 910 of the nut 904 of the joint assembly 900. When the joint assembly 900 is assembled, at least a portion of the one or more axially extending portions 912 of the nut 904 are plastically deformed radially inboard toward the one or more staking grooves 906 in the outer surface 614 of the third shaft 902. The one or more axially extending portions 912 of the nut 904 may be plastically deformed radially inboard until at least a portion of the one or more axially extending portions 912 are received and/or retained within at least a portion of the one or more staking grooves 906 in the outer surface 614 of the third shaft 902. This aids in ensuring that the nut 904 is securely connected to the third shaft 902 thereby aiding in preventing the nut 904 from turning off or unscrewing from the third shaft 902 when the joint assembly 900 is in operation.

One or more cut-back portions 914 may be disposed radially outboard from and directly adjacent to at least a portion of the one or more axially extending portions 912 of the nut 904. As illustrated in FIG. 7 of the disclosure and as a non-limiting example, the one or more cut-back portions 932 may circumferentially extend inward from at least a portion of the second end 910 of the nut 904. It is to be understood that the one or more cut-back portions 914 in the nut 904 may aids in facilitating the plastic deformation of the one or more axially extending portions 912 of the nut 904 into the one or more staking grooves 906 of the third shaft 902 of the joint assembly 900. This aids in reducing the overall amount of time and costs associated with the assembly of the joint assembly 900.

A second plurality of nut threads 916 may circumferentially extend along at least a portion of the outer surface 614 of the third shaft 902 of the joint assembly 900. As illustrated in FIGS. 7 and 7A and as a non-limiting example, the second plurality of nut threads 916 may be disposed axially inboard from and directly adjacent to an end of the one or more staking grooves 906 opposite the third shaft sealing member groove 812 in the third shaft 912.

Extending co-axially with and disposed radially outboard from at least a portion of the third shaft 902 may be a second nut 918 having a first end 920, a second end (not shown), a first end portion 922, a second end portion (not shown), an inner surface 924 and an outer surface 926. Circumferentially extending along at least a portion of the inner surface 916 of the second nut 918 is a plurality of second nut threads 928. The plurality of second nut threads 928 on the inner surface 916 of the second nut 918 may be complementary to and meshingly engaged with the second plurality of nut threads 916 on the outer surface 614 of the third shaft 902 of the joint assembly 900.

One or more axially extending portions 930 may extend axially outboard from at least a portion of the first end 920 of the second nut 918 of the joint assembly 900. When the joint assembly 900 is assembled, at least a portion of the one or more axially extending portions 912 of the nut 904 may be plastically deformed radially inboard toward the one or more staking grooves 906 in the outer surface 614 of the third shaft 902. The one or more axially extending portions 930 of the second nut 918 may be deformed radially inboard until at least a portion of the one or more axially extending portions 930 are received and/or retained within at least a portion of the one or more staking grooves 906 in the outer surface 614 of the third shaft 902. This aids in ensuring that the second nut 918 is securely connected to the third shaft 902 and aids in preventing the second nut 918 from turning off or unscrewing from the third shaft 902 when the joint assembly 900 is in operation.

The second nut 918 may include one or more cut-back portions 932. The one or more cut-back portions 932 may be disposed radially outboard from at least a portion of the one or more axially extending portions 930 of the second nut 918. As best seen in FIG. 7 of the disclosure and as a non-limiting example, the one or more cut-back portions 932 may extend inward from at least a portion of the first end 920 of the second nut 918. It is to be understood that the one or more cut-back portions 932 of the second nut 918 may aid in facilitating the plastic deformation of the one or more axially extending portions 930 of the second nut 918 into the one or more staking grooves 906 of the third shaft 902 of the joint assembly 900. This aids in reducing the overall amount of time and costs associated with the assembly of the joint assembly 900. As a non-limiting example, the one or more cut-back portions 932 may be substantially V-shaped.

The second nut 918 may include an increased diameter portion 934. The axially extending portion 934 may extend radially outboard from at least a portion of the outer surface 926 of the first end portion 922 of the second nut 918. The increased diameter portion 934 of the joint assembly 900 may be used in order to aid in protecting a sealing assembly 936 of the joint assembly 900 from coming into direct contact with dirt and/or debris.

As best seen in FIG. 7 of the disclosure and as a non-limiting example, the sealing assembly 936 may include a slinger 938 and/or a fourth sealing member 940. The slinger 938 of the sealing assembly 936 may have a first substantially horizontal portion 942, a substantially vertical portion 944 and/or a second substantially horizontal portion 945. As illustrated in FIG. 7 of the disclosure and as a non-limiting example the second substantially horizontal portion 945 of the sealing assembly 936 may extend axially outboard from an end of the substantially vertical portion 944 of the slinger 938 opposite the first substantially horizontal portion 942. Additionally, as illustrated in FIG. 7 and as a non-limiting example, the second substantially horizontal portion 945 may extend axially outboard from the substantially vertical portion 944 of the slinger 938 in a direction opposite the first substantially horizontal portion 942. It is therefore within the scope of this disclosure and as a non-limiting example that the slinger 938 of the sealing assembly 936 may have a substantially Z-shaped cross-sectional shape.

At least a portion of an inner surface 946 of the first substantially horizontal portion 942 of the slinger 938 may be integrally connected to at least a portion of the outer surface 926 of the second nut 918 of the joint assembly 900. It is within the scope of this disclosure and as a non-limiting example that the inner surface 946 of the first substantially horizontal portion 942 of the slinger 938 may be integrally connected to at least a portion of the outer surface 926 of the second nut 918 by using one or more welds, one or more mechanical fasteners, one or more adhesives, a spline connection, a threaded connection and/or an interference fit.

Interposed between at least a portion of the outer surface 926 of the second nut 918 and at least a portion of an inner surface 948 of a housing 950 is the fourth sealing member 940. As best seen in FIG. 7 of the disclosure and as a non-limiting example, at least a portion of the fourth sealing member 940 may be sealingly engaged with at least a portion of the inner surface 948 of the housing 950, the outer surface 926 of the second nut 918 and/or the substantially vertical portion 944 of the slinger 938. The fourth sealing member 940 may aid in preventing the migration of dirt, debris and/or moisture into the housing 950. It is within the scope of this disclosure and as a non-limiting example, the housing 950 may be a differential assembly housing, a transmission housing, a power transmission unit housing, a transfer case housing, a front axle system differential assembly housing, a rear axle system differential assembly housing, an inter-axle differential assembly housing, a forward tandem axle differential assembly housing, a rear tandem axle differential assembly housing, a front axle system housing, a rear axle system housing, a forward tandem axle system housing and/or a rear tandem axle system housing.

Figure 8:
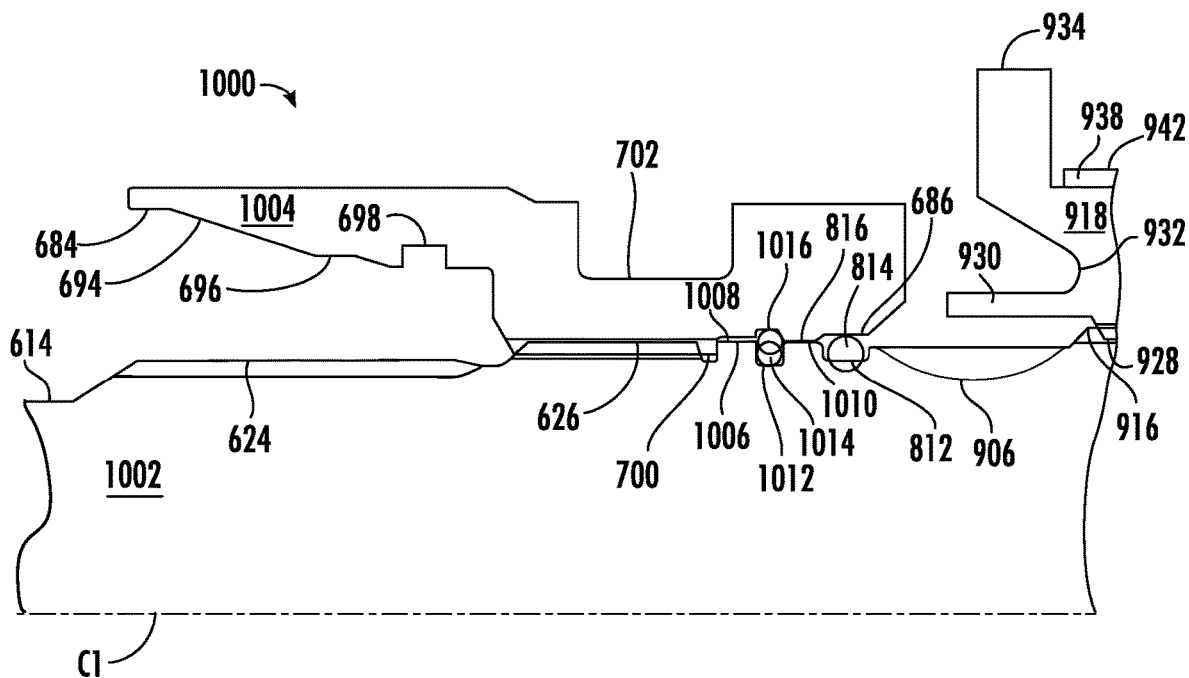
FIG. 8 is a cut-away schematic side-view of a portion of the joint assembly illustrated in FIGS. 5-7A according to yet another embodiment of the disclosure.

FIG. 8 is a cut-away schematic side-view of a portion of a joint assembly 1000 according to yet another embodiment of the disclosure. The joint assembly 1000 illustrated in FIG. 8 of the disclosure is the same as the joint assemblies 500, 800 and 900 illustrated in FIGS. 5-7A, except where specifically noted below. As illustrated in FIG. 8 of the disclosure, the joint assembly 1000 includes a third shaft 1002 and a nut 1004. The third shaft 1002 and the nut 1004 of the joint assembly 1000 illustrated in FIG. 8 is the same as the third shaft 612, 802 and 902 and the nut 682, 804 and 904 of the joint assemblies 500, 800 and 900 illustrated in FIGS. 5-7A, except where specifically noted below.

In accordance with the embodiment illustrated in FIG. 8 of the disclosure and as a non-limiting example, the third shaft 1002 may further include a nut stopper portion 1006 having a first end portion 1008 and a second end portion 1010. When the joint assembly 1000 is assembled, at least a portion of the plurality of nut threads 700 on the second inner surface 686 of the nut 1004 may be in direct contact with at least a portion of the nut stopper portion 1006 of the third shaft 1002. The nut stopper portion 1006 of the third shaft 1002 may provide a positive stop for the nut 1004 thereby aiding in preventing the nut 1004 from turning off or unscrewing from the third shaft 1002 when the joint assembly 1000 is in operation. This aids in improving the overall life, durability and operability of the joint assembly 1000.

The third shaft 1002 may include a third shaft retaining member groove 1012. As illustrated in FIG. 8 of the disclosure and as a non-limiting example, the third shaft retaining member groove 1012 may circumferentially extend along at least a portion of the outer surface 614 of the nut stopper portion 1006 of the third shaft 1002. The third shaft retaining member groove 1012 may be of a size and shape to receive and/or retain at least a portion of a fourth retaining member 1014. It is within the scope of this disclosure and as a non-limiting example that the fourth retaining member 1014 of the joint assembly 1000 may be a snap-ring, a circlip, a C-clip, a jesus clip or a seeger ring.

A second nut retaining member groove 1016 may circumferentially extend along at least a portion of the second inner surface 686 of the nut 1004 of the joint assembly 1000. As illustrated in FIG. 8 of the disclosure and as a non-limiting example, the second nut retaining member groove 1016 may be disposed adjacent to an end of the plurality of nut threads 700 on the second inner surface 686 of the nut 1004 opposite the nut retaining member groove 698. Additionally, as illustrated in FIG. 8 and as a non-limiting example, at least a portion of the second nut retaining member groove 1016 in the nut 1004 may be disposed radially outboard from and aligned with at least a portion of the third shaft retaining member groove 1012 in the third shaft 1002. The second nut retaining member groove 1016 in the second inner surface 686 of the nut 1004 may be of a size and shape needed to receive and/or retain at least a portion of the fourth retaining member 1014 of the joint assembly 1000. It is to be understood that the fourth retaining member 1014 may be disposed within at least a portion of the second nut retaining member groove 1016 and the third shaft retaining member groove 1012 thereby aiding in ensuring that the nut 1004 is securely connected to the third shaft 1002. This aids in preventing the nut 1004 from turning off or unscrewing from the third shaft 1002 when the joint assembly 1000 is in operation.

Figure 9:
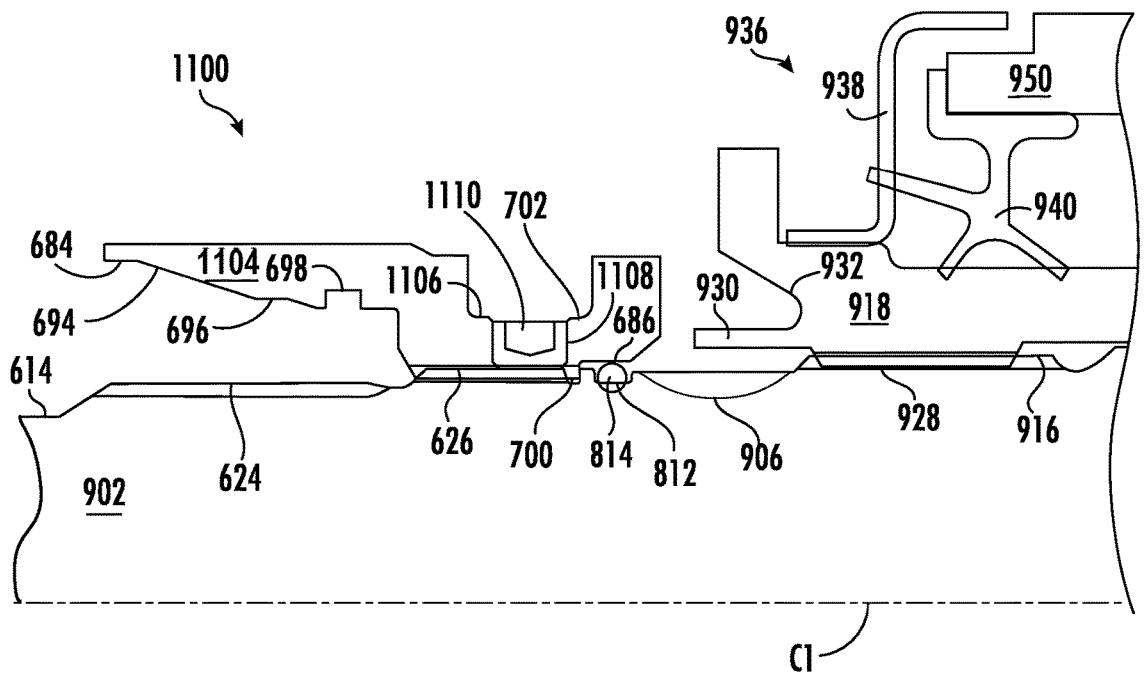
FIG. 9 is cut-away schematic side-view of a portion of the joint assembly illustrated in FIGS. 5-8 according to still yet another embodiment of the disclosure.

FIG. 9 is a cut-away schematic side-view of a portion of a joint assembly 1100 according to still yet another embodiment of the disclosure. The joint assembly 1100 illustrated in FIG. 9 is the same as the joint assemblies 500, 800, 900 and 100 illustrated in FIGS. 5-8, except where specifically noted below. As illustrated in FIG. 8 of the disclosure, the joint assembly 1100 includes a nut 1104. The nut 1104 of the joint assembly 1100 illustrated in FIG. 9 is the same as the nut 682, 804, 904 and 1004 illustrated in FIGS. 5-8, except where specifically noted below.

In accordance with the embodiment illustrated in FIG. 9 of the disclosure and as a non-limiting example, the nut 1104 may include one or more set-screw apertures 1108. The one or more set-screw aperture 1108 may extend from an innermost surface 1106 of the one or more nut tool grooves 702 to the second inner surface 686 of the nut 1104. The one or more set screw apertures 1108 in the nut 1104 may be of a size and shape needed to receive and/or retain at least a portion of one or more set-screws 1110 therein. It is within the scope of this disclosure and as a non-limiting example that the one or more set-screws 1110 may be received and/or retained within at least a portion of the one or more set screw apertures 1108 by using a threaded connection, a press-fit connection and/or one or more adhesives.

When assembled, at least a portion of the one or more set-screws 1110 may extend through the one or more set-screw apertures 1108 toward the outer surface 614 of the third shaft 902 until at least a portion of the one or more set screws 1110 are in direct contact with at least a portion of the plurality of third shaft threads 626 on the outer surface 614 of the third shaft 902. It is to be understood that the one or more set-screws 1110 disposed within the one or more set-screw apertures 1108 of the nut 1104 may aid in ensuring that the nut 1104 is securely connected to the third shaft 902. This aids in preventing the nut 1104 from turning off or unscrewing from the third shaft 902 when the joint assembly 1100 is in operation thereby improving the overall life, durability and operability of the joint assembly 1100.

FIGS. 10-10C provide a schematic illustration of a tool 1200 according to an embodiment of the disclosure. It is within the scope of this disclosure and as a non-limiting example that the tool 1200 may be used in order to assemble and/or disassemble the joint assembly 500, 800, 900, 1000 and/or 1100 described and illustrated herein.

As best seen in FIG. 10 of the disclosure and as a non-limiting example, the tool 1200 includes a first body portion 1202 and a second body portion 1204. In accordance with the embodiment illustrated in FIG. 10 of the disclosure and as a non-limiting example the first body member 1204 of the tool 1200 may include an axially extending portion 1206 having a first end portion 1208 and a second end portion 1210. Extending radially inboard from at least a portion of the first end portion 1208 of the axially extending portion 1206 of the first body portion 1204 is a radially extending portion 1212.

Pivotably connected to an end of the radially extending portion 1212 of the first body portion 1202 of the tool 1200, opposite the axially extending portion 1206 of the first body portion 1202, is a first gripping arm 1214 and/or a second gripping arm 1216. As best seen in FIG. 10C and as a non-limiting example, the first and second gripping arms 1214 and 1216 of the tool 1200 may be of a size and shape needed to be received and/or retained within the one or more first joint member tool grooves 532 in the outer surface 530 of the first joint member 502. The first and second gripping arms 1214 and 1216 of the tool 1200 may be operably connected to the radially extending portion 1212 of the first body portion 1202 of the tool 1200 in order to allow the first and second gripping arms 1214 and 1216 to move toward and away from one another. It is within the scope of this disclosure and as a non-limiting example that the first and second gripping arms 1214 and 1216 of the tool 1200 may have a substantially half circle shape.

As illustrated in FIG. 10 of the disclosure and as a non-limiting example, the second body portion 1204 of the tool 1200 may have an axially extending portion 1218 and a radially extending portion 1220. In accordance with the embodiment illustrated in FIG. 10 and as a non-limiting example, the axially extending portion 1218 of the second body portion 1204 of the tool 1200 has a first end 1222, a second end 1224, a first end portion 1226 and a second end portion 1228. Extending axially inboard from at least a portion of the first end 1222 of the axially extending portion 1218 of the second body portion 1204 is a hollow interior portion 1230. The hollow interior portion 1230 of the axially extending portion 1218 of the second body portion 1204 of the tool 1200 may be of a size and shape needed to receive and/or retain at least a portion of the axially extending portion 1206 of the first body portion 1202 of the tool 1200. As a result, it is to be understood that at least a portion of the first body portion 1202 of the tool 1200 may be slidingly engaged with at least a portion of the second body portion 1204 of the tool 1200.

Pivotably connected to an end of the radially extending portion 1220 of the second body portion 1204 of the tool 1200, opposite the axially extending portion 1218 of the second body portion 1204, is a third gripping arm 1232 and/or a fourth gripping arm 1234. As best seen in FIG. 10C of the disclosure and as a non-limiting example, the third and fourth gripping arms 1232 and 1234 of the tool 1200 may be of a size and shape needed to be received and/or retained within at least a portion of the one or more nut tool grooves 702 in the outer surface 688 of the nut 682. The third and fourth gripping arms 1232 and 1234 of the tool 1200 may be operably connected to the radially extending portion 1220 of the second body portion 1204 of the tool 1200 so as to allow the third and fourth gripping arms 1232 and 1234 to move toward and away from one another. It is within the scope of this disclosure and as a non-limiting example that the third and fourth gripping arms 1232 and 1234 of the tool 1200 may have a substantially half circle shape.

At least a portion of a first arm 1236 having a first end portion 1238 and a second end portion 1240 may be connected to at least a portion of the first end portion 1208 of the axially extending portion 1206 of the first body portion 1202 of the tool 1200. As best seen in FIG. 10 of the disclosure and as a non-limiting example, at least a portion of the first end portion 1238 of the first arm 1236 of the tool 1200 may be pivotably connected to at least a portion of the first end portion 1208 of the axially extending portion 1206 of the first body portion 1202 of the tool 1200.

A second arm 1242 having a first end portion 1244 and a second end portion 1246 may connect at least a portion of the first arm 1236 to at least a portion of the second body portion 1204 of the tool 1200. At least a portion of the first end portion 1244 of the second arm 1242 may be pivotably connected to at least a portion of the first end portion 1226 of the axially extending portion 1218 of the second body portion 1204 of the tool 1200. Additionally, at least a portion of the second end portion 1246 of the second arm 1242 may be pivotably connected to at least a portion of the second end portion 1240 or an intermediate portion 1241 of the first arm 1236 of the tool 1200.

It is to be understood that the connection of the first arm 1236 to the first body portion 1202 and the second arm 1242 and the connection of the second arm 1242 to the first arm 1236 and the second body portion 1204 of the tool 1200 allows for the first body portion 1202 to move axially relative to the second body portion 1204 of the tool 1200. When the first arm 1236 is moved radially inward, toward the first and second body portion 1202 and 1204 of the tool 1200, the first body portion 1202 moves axially toward the second body portion 1204 of the tool 1200. This aids in providing the force needed in order to connect of the nut 682 to the second shaft 562 and/or to connect the third shaft 612 to the second shaft 562. As a result, this aids in ensuring that the second joint member 504 is properly drivingly connected to the gear 630.

When the first arm 1236 is moves radially outward, away from the first and second body portion 1202 and 1204 of the tool 1200, the first body portion 1202 moves axially away from the second body portion 1204 of the tool 1200. This aids in providing the force needed in order to separate of the nut 682 from the second shaft 562 and/or to separate the third shaft 612 from the second shaft 562. As a result, this aids in drivingly disconnecting the second joint member 504 from the gear 630.

Additionally, the movement of the first arm 1236 may be used in order to facilitate the engagement of the first and/or second gripping arms 1214 and/or 1216 with the one or more first joint member tool grooves 532 in the first joint member 502. Furthermore, the movement of the first arm 1236 may be used in order to facilitate the engagement of the third and/or fourth gripping arms 1232 and/or 1234 with the one or more nut tool grooves 702 of the nut 682 for the assembly and disassembly of the joint assemblies 500, 800, 900, 1000, 1100 and/or 1200.

Figure 11:
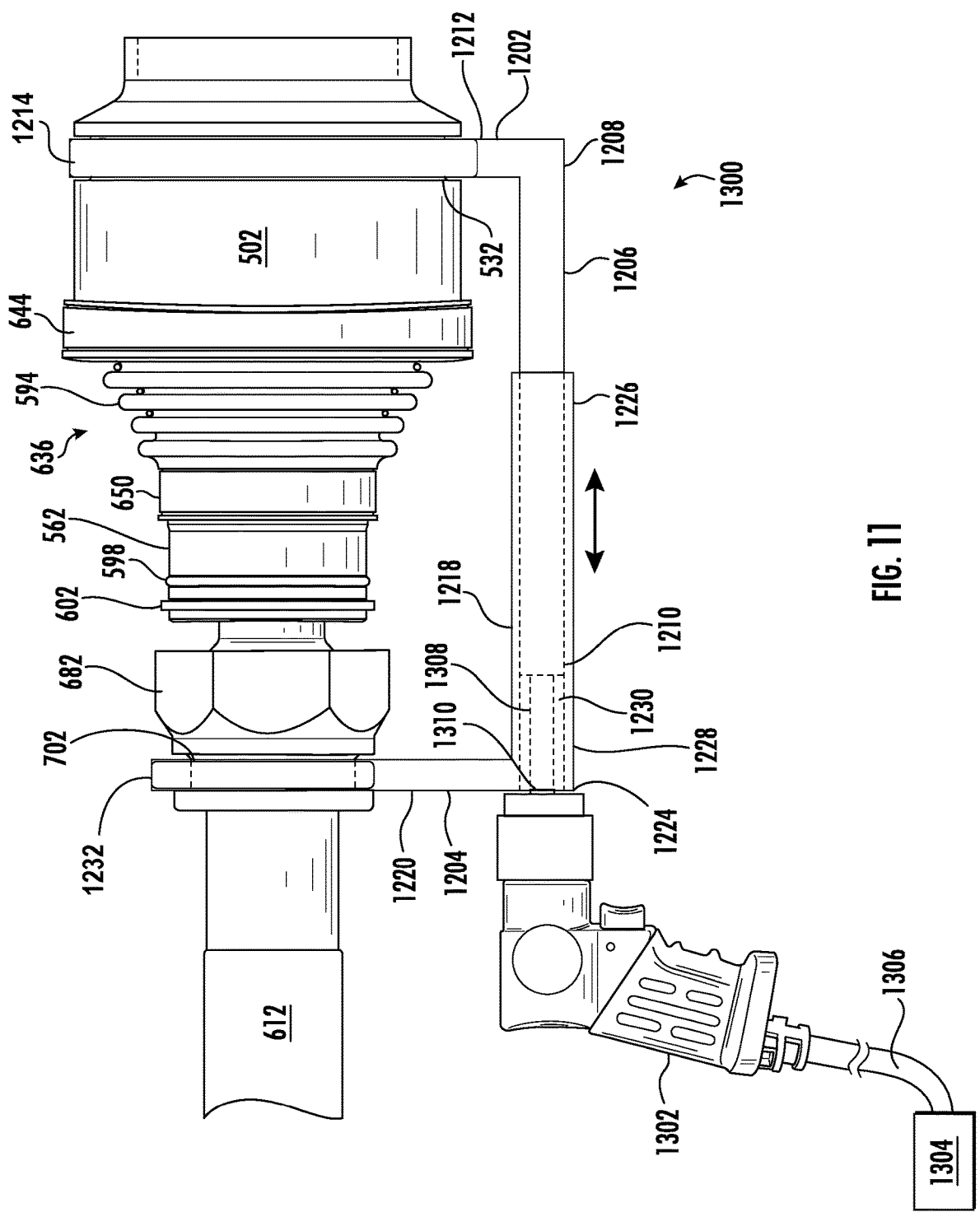
FIG. 11 is a schematic side-view of a tool according to an alternative embodiment of the disclosure.

FIG. 11 of the disclosure is a schematic side-view of a tool 1300 according to an alternative embodiment of the disclosure. The tool 1300 illustrated in FIG. 11 of the disclosure is the same as the tool 1200 illustrated in FIGS. 10-10C, except where specifically noted below. It is within the scope of this disclosure and as a non-limiting example that the tool 1300 may be used in order to assemble and/or disassemble the joint assembly 500, 800, 900, 1000 and/or 1100 described and illustrated herein.

As illustrated in FIG. 11 of the disclosure and as a non-limiting example, the tool 1300 may include an actuation device 1302 that is connected to at least a portion of a power source 1304 via one or more power supply lines 1306. The power source 1304 may provide the power to the actuation device 1302 needed to move the first body portion 1202 axially relative to the second body portion 1204 of the tool 1300 during the assembly and disassembly process. It is within the scope of this disclosure and as a non-limiting example, that the power source 1304 may be an air supply tank or a hydraulic fluid tank. Additionally, it is within the scope of this disclosure and as a non-limiting example that the one or more power supply lines 1306 may be one or more air supply lines or one or more hydraulic supply lines that fluidly connect the actuation device 1302 to at least a portion of the power source 1304. In light of the foregoing, it is therefore within the scope of this disclosure and as a non-limiting example that the actuation device 1302 may be a pneumatic actuation device or a hydraulic actuation device.

A shaft portion 1308 may be integrally connected to at least a portion of the actuation device 1302 of the tool 1300. As illustrated in FIG. 11 of the disclosure and as a non-limiting example, at least a portion of the shaft portion 1308 may extend through a shaft portion aperture 1310 in the second end 1224 of the axially extending portion 1218 of the second body portion 1204 of the tool 1300. At least a portion of an end of the shaft portion 1308, opposite the actuation device 1302, may be integrally connected to at least a portion of the second end portion 1210 of the axially extending portion 1206 of the first body portion 1202 of the tool 1300.

When activated, the actuation device 1302 may be operably configured in order to selectively move the shaft portion 1308 of the tool 1300 axially in a first direction and/or a second portion. When the actuation device 1302 moves the shaft portion 1308 to the first position, the first body portion 1202 is moved axially toward the second body portion 1204 of the tool 1300. This aids in providing the force needed in order to connect of the nut 682 to the second shaft 562 and/or to connect the third shaft 612 to the second shaft 562. This aids in ensuring that the second joint member 504 properly drivingly connected the gear 630.

When the actuation device 1302 is activated to move the shaft portion 1308 axially in to the second direction, opposite the first direction, the first body portion 1202 is moved axially away from the second body portion 1204 of the tool 1300. This aids in providing the force needed to separate of the nut 682 from the second shaft 562 and/or to separate the third shaft 612 from the second shaft 562. This aids in ensuring that the second joint member 504 is drivingly disconnected from the gear 630.

Additionally, the movement of the shaft portion 1308 may aid in facilitating the engagement of the first and/or second gripping arms 1214 and/or 1216 with the one or more first joint member tool grooves 532 in the first joint member 502. Furthermore, the movement of the shaft portion 1308 may aid in facilitating the engagement of the third and/or fourth gripping arms 1232 and/or 1234 with the one or more nut tool grooves 702 of the nut 682 for the assembly and disassembly of the joint assemblies 500, 800, 900, 1000 and/or 1100.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed:

1. A joint assembly, comprising:
   a first joint member drivingly connected to a second joint member by using one or more third joint members;
     wherein said first joint member has a first end, a second end, a first end portion, a second end portion, an intermediate portion and an outer surface;
     wherein at least a portion of said first joint member is drivingly connected to at least a portion of a first shaft and at least a portion of said second joint member is drivingly connected to at least a portion of a second shaft;
     wherein one or more first joint member tool grooves circumferentially extends along at least a portion of said outer surface of said first joint member;
   a nut having a first end, a second end, a first inner surface, a second inner surface and an outer surface;
     wherein said nut drivingly connects at least a portion of a third shaft to at least a portion of said second shaft;
     wherein said third shaft comprises a nut stopper portion circumferentially extending along at least a portion of an outer surface of said third shaft;
     wherein said nut stopper portion is disposed adjacent to an end of a plurality of third shaft threads on said outer surface of said third shaft opposite said second shaft; and
     wherein said nut stopper portion provides a positive stop for said nut preventing said nut from turning off or unscrewing when said joint assembly is in operation; and
     wherein one or more nut tool grooves circumferentially extends along at least a portion of said outer surface of said nut; and wherein said one or more first joint member tool grooves and said one or more nut tool grooves have a size and shape to receive and/or retain at least a portion of a tool therein.

2. The joint assembly of claim 1, wherein said joint assembly is a constant velocity joint assembly, a CV joint assembly, a homokinetic joint assembly or a direct pinion mount constant velocity joint assembly.

3. The joint assembly of claim 1, wherein said third shaft is a pinion gear shaft.

4. The joint assembly of claim 1,
   wherein said outer surface of said nut stopper portion has a radius R2 from a centerline of said joint assembly that increases from a first end portion to a second end portion of said nut stopper portion;
   wherein a reduced diameter portion circumferentially extends from at least a portion of said second inner surface of said nut;
   wherein an innermost surface of said reduced diameter portion of said nut has a radius R3 from said centerline of said joint assembly that increases from a first end portion to a second end portion of said reduced diameter portion; and
   wherein said nut stopper portion of said third shaft and said reduced diameter portion of said nut provides an interference fit between said nut and said third shaft to provide a positive stop for said nut preventing said nut from turning off or unscrewing when said joint assembly is in operation.

5. The joint assembly of claim 4, wherein said radius R3 of said reduced diameter portion on said nut is substantially equal to or less than said radius R2 of said nut stopper portion on said third shaft.

6. The joint assembly of claim 1, wherein one or more axially extending portions extend outward from at least a portion of said second end of said nut;
   wherein at least a portion of said one or more axially extending portions are plastically deformed inward into one or more staking grooves extending along at least a portion of said outer surface of said third shaft; and wherein said one or more axially extending portions prevent said nut from turning off or unscrewing when said joint assembly is in operation.

7. The joint assembly of claim 6, wherein one or more cut-back portions circumferentially extend inward from at least a portion of said second end of said nut;
   wherein said one or more cut-back portions are disposed proximate to an end of said one or more axially extending portions of said nut; and
   wherein said one or more cut-back portions aid in plastically deforming said one or more axially extending portions into said one or more staking grooves in said third shaft.

8. The joint assembly of claim 1, wherein said third shaft further comprises a third shaft retaining member groove circumferentially extends along at least a portion of said outer surface of said third shaft;
   wherein said third shaft retaining member groove is disposed adjacent to an end of a third plurality of shaft threads on said third shaft opposite said second shaft;
   wherein a second nut retaining member groove circumferentially extends along at least a portion of said second inner surface of said nut; and
   wherein at least a portion of a fourth retaining member is received and/or retained within at least a portion of said third shaft retaining member groove in said third shaft and said second nut retaining member groove in said nut.

9. The joint assembly of claim 1, wherein one or more set-screw apertures extend from an innermost surface of said one or more nut tool grooves in said nut to said second inner surface of said nut;
   wherein at least a portion of one or more set-screws are received and/or retained within at least a portion of said one or more set-screw apertures in said nut; and
   wherein said one or more set-screws prevent said nut from turning off or unscrewing when said joint assembly is in operation.

10. The joint assembly of claim 1, further comprising a second nut having a first end, a second end, a first end portion, a second end portion, an inner surface and an outer surface;
    wherein a plurality of second nut threads circumferentially extend along at least a portion of said inner surface of said second nut;
    wherein said plurality of second nut threads are complementary to and meshingly engaged with a second plurality of nut threads circumferentially extending along at least a portion of an outer surface of said third shaft; and
    wherein at least a portion of a fourth sealing member is interposed between and sealingly engaged with at least a portion of said outer surface of said second nut and an inner surface of a housing.

11. The joint assembly of claim 10, further comprising a slinger connected to at least a portion of said outer surface of said second nut and disposed outboard from at least a portion of said housing.

12. The joint assembly of claim 10, wherein said second nut has an increased diameter portion that extends outward from at least a portion of said outer surface of said second nut; and
    wherein said increased diameter portion prevents an amount of dirt and/or debris from coming into direct contact with said slinger.

13. The joint assembly of claim 10, wherein one or more axially extending portions extend outward from at least a portion of said first end of said second nut;
    wherein at least a portion of said one or more axially extending portions of said second nut are plastically deformed inward into one or more staking grooves extending along at least a portion of said outer surface of said third shaft; and
    wherein said one or more axially extending portions prevent said second nut from turning off or unscrewing when said joint assembly is in operation.

14. The joint assembly of claim 13, wherein one or more cut-back portions circumferentially extend inward from at least a portion of said first end of said second nut;
    wherein said one or more cut-back portions are disposed proximate to an end of said one or more axially extending portions of said second nut; and
    wherein said one or more cut-back portions aid in plastically deforming said one or more axially extending portions into said one or more staking grooves in said third shaft.

15. The joint assembly of claim 1, wherein said tool has a first gripping arm, a second gripping arm, a third gripping arm and/or a fourth gripping arm;
    wherein at least a portion of said first gripping arm and and/or said second gripping arm are selectively engagable with at least a portion of said one or more first joint member tool grooves in said first joint member;
    wherein at least a portion of said third gripping arm and/or said fourth gripping arm are selectively engagable with said one or more nut tool grooves in said nut; and
    wherein said tool applies an amount of force onto said first joint member and said nut in order to drive said nut and said third shaft toward and/or away from said second shaft to selectively connect and/or disconnect said nut to and/or from said second shaft.

16. The joint assembly of claim 15, wherein said tool comprises a first body portion, a second body portion, a first arm and a second arm;
    wherein at least a portion of said first gripping arm and/or said second gripping arm are connected to at least a portion of said first body portion of said tool;
    wherein at least a portion of said first body portion of said tool is connected to at least a portion of said second body portion of said tool;
    wherein at least a portion of said third gripping arm and/or said fourth gripping arm are connected to at least a portion of said second body portion of said tool;
    wherein at least a portion of said first arm of said tool is connected to at least a portion of said first body portion of said tool;
    wherein at least a first end portion of the second arm is connected to the second body portion and a different second end portion of the second arm is connected to the first arm;
    wherein by selectively moving said first arm of said tool, said first body portion is translated axially relative to said second body portion of said tool, in order to selectively connect and/or disconnect said nut to and/or from said second shaft.

17. The joint assembly of claim 1, wherein said tool comprises a first body portion, a second body portion;
    wherein at least a portion of a first gripping arm and/or a second gripping arm are connected to at least a portion of said first body portion of said tool;

wherein at least a portion of a third gripping arm and/or a fourth gripping arm are connected to at least a portion of said second body portion of said tool;

wherein at least a portion of said first body portion of said tool is connected to at least a portion of said second body portion of said tool;

wherein at least a portion of a shaft portion of an actuation device is drivingly connected to at least a portion of said first body portion and/or said second body portion of said tool; and wherein by selectively moving said shaft portion of said actuation device of said tool, said first body portion is translated axially relative to said second body portion of said tool, in order to selectively connect and/or disconnect said nut to and/or from said second shaft.

18. The joint assembly of claim 17, wherein said actuation device is a pneumatic actuation device or a hydraulic actuation device.

* * * * *